United States Patent
Beas Bujanos et al.

(10) Patent No.: US 10,225,013 B2
(45) Date of Patent: Mar. 5, 2019

(54) CHANNEL MANAGEMENT TO PROVIDE NARROWCAST DATA SERVICES USING VISIBLE LIGHT COMMUNICATION

(71) Applicant: ARRIS Enterprises LLC, Suwanee, GA (US)

(72) Inventors: Joaquin Beas Bujanos, Escobedo (MX); Carlos Dominguez Jimenez, Apodaca (MX); Jose Luis Lopez, Mission, TX (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 15/367,168

(22) Filed: Dec. 1, 2016

(65) Prior Publication Data
US 2018/0159621 A1 Jun. 7, 2018

(51) Int. Cl.
| G02B 6/36 | (2006.01) |
| H04B 10/00 | (2013.01) |
| H04L 7/00 | (2006.01) |
| H04B 10/116 | (2013.01) |
| H04B 10/27 | (2013.01) |
| H04J 14/02 | (2006.01) |

(52) U.S. Cl.
CPC ........ H04B 10/116 (2013.01); H04B 10/27 (2013.01); H04J 14/0227 (2013.01)

(58) Field of Classification Search
CPC ..... H04B 10/116; H04B 10/27; H04J 14/0227
USPC .......................................... 398/116, 115, 118
See application file for complete search history.

(56) References Cited

U.S. PATENT DOCUMENTS

| 6,353,490 | B1 | 3/2002 | Singer et al. |
| 8,494,364 | B2 | 7/2013 | Kramer et al. |
| 8,537,861 | B2 | 9/2013 | Howard et al. |
| 8,867,916 | B2 | 10/2014 | Buchali et al. |
| 8,873,657 | B2 | 10/2014 | Liu et al. |
| 9,401,764 | B2 * | 7/2016 | Gottwald ........... H04B 10/2575 |
| 9,571,312 | B2 * | 2/2017 | Brandt-Pearce .... H04L 25/4902 |

(Continued)

FOREIGN PATENT DOCUMENTS

| EP | 1564914 A1 | 8/2005 |
| EP | 2768162 A1 | 8/2014 |

OTHER PUBLICATIONS

Howald, Robert L., "4K Reasons to Accelerate to All-IP", 2015 Spring Technical Forum Proceedings, Nov. 5, 2015, 15 pages.

(Continued)

*Primary Examiner* — Oommen Jacob
(74) *Attorney, Agent, or Firm* — Lori Anne D. Swanson

(57) ABSTRACT

Particular embodiments use the segmented bandwidth in downstream channels and upstream channels to manage a narrowcast service for subscribers. Particular embodiments include a channel manager that can process the signal from the headend to down-convert and filter narrowcast services that are sent in one or more of the downstream channels. Also, in the upstream direction, the channel manager can up-convert and stack narrowcast signals for sending to the headend. Further, in one embodiment, the narrowcast service may be provided using visible light communication (e.g., Li-Fi). Using visible light communication may overcome the last connection restrictions described in the background, such as end to end optical connections may be used. Further, using visible light communication may not interfere with other Wi-Fi links in the subscriber premises, such as existing MoCA connections, and may actually enhance the service at the subscriber premises.

19 Claims, 17 Drawing Sheets

(56) References Cited

U.S. PATENT DOCUMENTS

| | | | |
|---|---|---|---|
| 2005/0002673 A1 | 1/2005 | Okano et al. | |
| 2008/0304833 A1 | 12/2008 | Zheng | |
| 2009/0232502 A1* | 9/2009 | Miyashita | H04B 10/1143 398/79 |
| 2011/0076018 A1* | 3/2011 | Ghiggino | H04J 14/0226 398/58 |
| 2012/0263474 A1* | 10/2012 | Huang | H04B 10/25754 398/93 |
| 2013/0004173 A1 | 1/2013 | Maricevic et al. | |
| 2013/0089336 A1* | 4/2013 | Dahlfort | H04B 10/25759 398/115 |
| 2013/0202301 A1* | 8/2013 | Ago | H04B 10/116 398/58 |
| 2013/0266314 A1 | 10/2013 | Lee et al. | |
| 2014/0072264 A1* | 3/2014 | Schroder | H04J 14/00 385/76 |
| 2015/0046964 A1 | 2/2015 | Thompson et al. | |
| 2015/0093107 A1* | 4/2015 | Jovicic | H04B 10/116 398/25 |
| 2015/0304744 A1 | 10/2015 | Maricevic et al. | |
| 2016/0134917 A1 | 5/2016 | Hardin | |
| 2017/0041072 A1* | 2/2017 | Rong | H04B 10/116 |
| 2017/0054500 A1* | 2/2017 | Rong | H04B 10/116 |
| 2017/0078891 A1* | 3/2017 | Cariou | H04W 16/14 |
| 2017/0201321 A1* | 7/2017 | Uysal | H04B 10/116 |
| 2017/0207851 A1* | 7/2017 | Zeng | H04B 10/116 |

OTHER PUBLICATIONS

Mutalik, Venk et al, "The Yin and The Yang of a move to all fiber: Transforming HFC to an all fiber network while leveraging the deployed HFC assets", 2015 Spring Technical Forum Proceedings, Nov. 5, 2015, 26 pages.

Cheevers, Charles et al, "Gigabit Wi-Fi—Is It Driving a Home Network Topology That Requires an Access Point in Every Room?", SCTE Cable-Tec Expo 2015, ARRIS Enterprises, Oct. 2015, 37 pages.

Haas, Harald, "High-speed wireless networking using visible light", Optoelectronics & Communications, SPIE Newsroom, Apr. 13, 2013, 3 pages.

Serafimovski, Nikola, "pureLiFi, The future of VLC modulation is OFDM", Oct. 20, 2013, 5 pages.

Al-Banna, Ayham et al, The Spectral Efficiency of DOCSIS 3.1 Systems, SCTE, Sep. 22-25, 2014, 33 pages.

Al-Banna, Ayham et al, "DOCSIS 3.1 PHY I02 Specificatio is Released . . . Let's Go Build It!", Feb. 26, 2014.

PCT International Search Report & Written Opinion, Re: Application No. PCT/US2017/061999, dated Mar. 9, 2018.

W. Yiguang, et al., "Network Achitecture of a High-Speed Visible Light Communication Local Area Network", IEEE Photonics Technology Letters, vol. 27, No. 2, Jan. 15, 2015, pp. 197-200.

W. Yuanquan, et al., "Symmetrical full-duplex integrated passive optical network and optical wireless communication transmission system", Journal of Optical Communications and Networking, vol. 7, No. 7, Jul. 1, 2015, pp. 628-633.

L. Chung-Yi, et al., "Hybrid CATV/16-QAM-Digital CATV/16-QAM-OFDM in-building network over passive optical network and gradient index-plastic optical fiber-visible light communication transport", Optical Engineering Society of Photo-Optical Instrumentation Engineers, vol. 54, No. 3, Mar. 1, 2015, p. 36108.

* cited by examiner

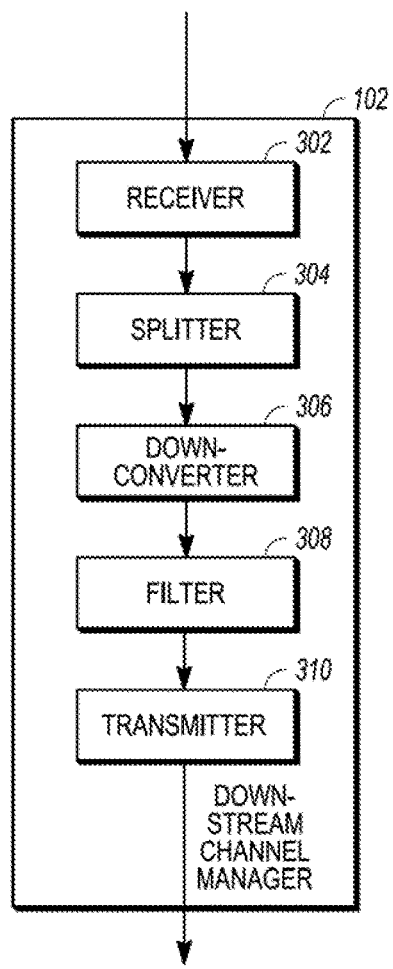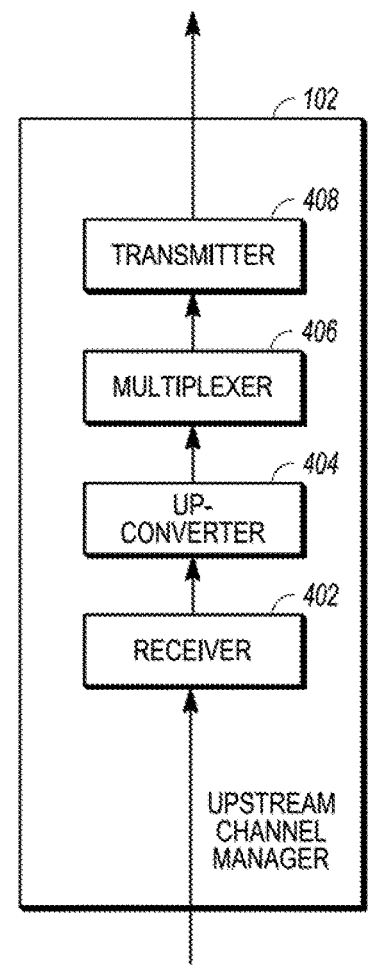
FIG. 3
FIG. 4

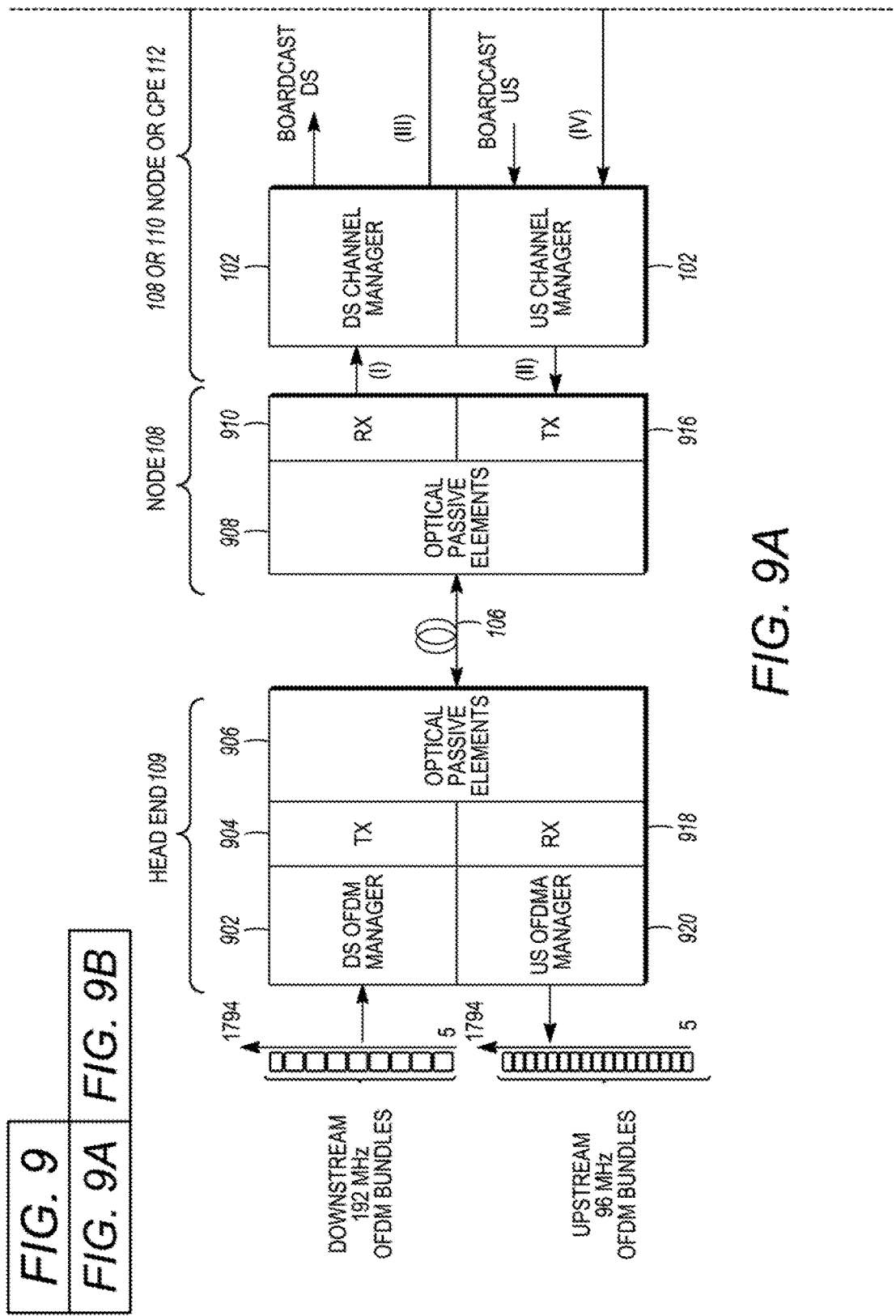

| FIG. 9A | FIG. 9B |

CHANNEL MANAGEMENT TO PROVIDE NARROWCAST DATA SERVICES USING VISIBLE LIGHT COMMUNICATION

BACKGROUND

To provide high-speed data services, network developers have expanded the optical distribution network infrastructure to be closer to the subscriber premises. Fiber To The Home (FTTH) networks based on Passive Optical Networks (PON) and Radio Fiber over Glass (RFoG) deployments based on Data Over Cable Service Interface Specification (DOCSIS) are just some examples to satisfy the above mentioned bandwidth demand. This increases the available bandwidth for subscribers. However, even with the increased amount of bandwidth, it is possible that future subscriber requirements may still run out of capacity. For example, when multiple users are sharing the available bandwidth at a specific subscriber location, the capacity available for each user may be reduced below the desired quality of service (QoS) because a high number of users may be simultaneously running data-consuming applications.

Some recent standards, such as data over cable service interface specification (DOCSIS) 3.1, segment available spectrum, such as in orthogonal frequency division multiplexing (OFDM) channels and orthogonal frequency division multiplexing access (OFDMA) channels, to manage downstream (DS) and upstream (US) bandwidth. OFDMA is a multi-user version of OFDM that is used in the upstream direction. However, the segmented available spectrum in DOCSIS 3.1 (in OFDM channels—"bundles") has not been completely exploited for an efficient management of US/DS bandwidth. On the other hand, the physical connections to the network at subscriber premises are typically implemented in the form of coaxial transmission cables or Wi-Fi links. Both of these technologies may have limitations. For example, when the coaxial cable infrastructure is used to connect devices at subscriber premises, such as a multimedia over coaxial alliance (MoCA), the cable bandwidth is shared among DS and US signals, which limits the ability to upgrade the DS and US networks to the full available spectrum of DOCSIS 3.1. Also, when operating in a Wi-Fi environment, the location of the Wi-Fi gateway is not always efficient, and attenuation around the customer premises causes signal issues and imminent reduction of available bandwidth for devices where mobility is not a concern.

SUMMARY

In one embodiment, a method receives a downstream multiplexed signal that includes a plurality of channels. The downstream multiplexed signal is split into a plurality of outputs. The method then converts at least a portion of the outputs into a plurality of channels at a similar frequency range and selects a set of channels in the plurality of channels. Channels in the set of channels are sent via narrowcast to a set of visible light communication access points using the similar frequency range, wherein a respective set of subscriber devices receive a channel in the set of channels via visible light communication from respective visible light communication access points.

In one embodiment, a non-transitory computer-readable storage medium contains instructions that, when executed, control a computer system to be configured for: receiving a downstream multiplexed signal that includes a plurality of channels; splitting the downstream multiplexed signal into a plurality of outputs; converting at least a portion of the outputs into a plurality of channels at a similar frequency range; selecting a set of channels in the plurality of channels; and sending channels in the set of channels via narrowcast to a set of visible light communication access points using the similar frequency range, wherein a respective set of subscriber devices receive a channel in the set of channels via visible light communication from respective visible light communication access points.

In one embodiment, an apparatus includes: one or more computer processors; and a non-transitory computer-readable storage medium comprising instructions that, when executed, control the one or more computer processors to be configured for: receiving a downstream multiplexed signal that includes a plurality of channels; splitting the downstream multiplexed signal into a plurality of outputs; converting at least a portion of the outputs into a plurality of channels at a similar frequency range; selecting a set of channels in the plurality of channels; and sending channels in the set of channels via narrowcast to a set of visible light communication access points using the similar frequency range, wherein a respective set of subscriber devices receive a channel in the set of channels via visible light communication from respective visible light communication access points.

The following detailed description and accompanying drawings provide a better understanding of the nature and advantages of particular embodiments.

BRIEF DESCRIPTION OF THE DRAWINGS

FIG. 3 depicts an architecture for a channel manager to process downstream signals according to one embodiment.

FIG. 4 depicts an architecture of the channel manager for the upstream direction according to one embodiment.

FIGS. 9A and 9B show the elements of FIGS. 7 and 8 overlaid over an RFoG/HFC network according to one embodiment.

DETAILED DESCRIPTION

Described herein are techniques for a channel manager to deliver data services using visible light communication. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments use the segmented bandwidth in downstream channels, such as orthogonal frequency division multiplexing (OFDM) channels, and upstream channels, such as orthogonal frequency division multiplexing access (OFDMA) channels, to manage a narrowcast service for subscribers. The narrowcast service provides a single subscriber dedicated bandwidth via the narrowcast service. The narrowcast service is different from a broadcast service in that the broadcast signal is sent to many subscribers and bandwidth is shared among those subscribers.

Particular embodiments include a channel manager that can process the signal from the headend to down-convert and filter narrowcast services that are sent in one or more of the downstream channels. Also, in the upstream direction, the channel manager can up-convert and stack narrowcast signals for sending to the headend. Further, in one embodiment, the narrowcast service may be provided using visible light communication (e.g., Li-Fi). Using visible light communication may overcome the last connection restrictions described in the background, such as end to end optical connections may be used. Further, using visible light communication may not interfere with other Wi-Fi links in the subscriber premises or existing MoCA connections, and may actually enhance the service at the subscriber premises.

Figure 1:
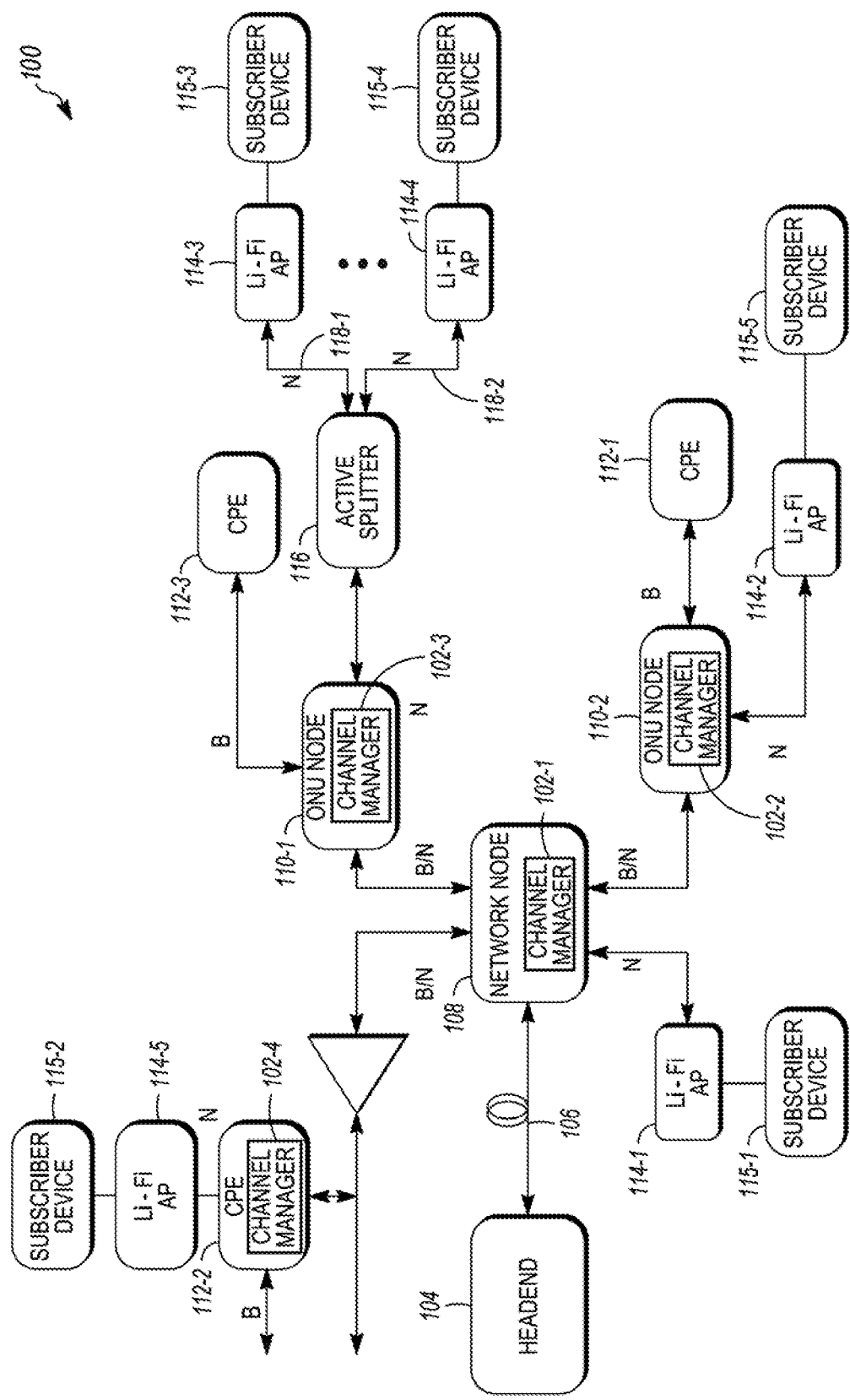
FIG. 1 depicts a simplified system for providing channel management for a narrowcast service according to one embodiment.

FIG. 1 depicts a simplified system 100 for providing channel management for a narrowcast service according to one embodiment. System 100 includes a headend 104, a network 106, a network node 108, optical networking unit (ONU) nodes 110-1 and 110-2, customer premise equipment (CPE) 112, visible light communication (Li-Fi) access points (AP) 114, subscriber devices 115, and an active splitter 116. Downstream communications may start from headend 104 and proceed to customer premise equipment 112 or subscriber devices 115. Also, upstream communications are from customer premise equipment 112 or subscriber devices 115 to headend 104.

Headend 104 may provide a data service, such as video, data, and/or voice service, to subscribers via customer premise equipment 112 and/or Li-Fi access points 114. Headend 104 may transmit and receive information over network 106, which may be an all-optical fiber service from headend 104 to network node 108, and also possibly all optical to ONU nodes 110 and/or Li-Fi access points 114. In some embodiments, network node 108 may also be connected to ONU nodes 110, which may be typically located at or near a subscriber premise. ONU node 110-1 may terminate the optical fiber network and convert signals from optical signals to radio frequency signals that may be sent over coaxial cable to customer premise equipment 112. In other embodiments, ONU node 110-1 may be connected to Li-Fi access points 114 or customer premise equipment 112 via optical connections or other connections, such as wireless connections. In other examples, network node 108 may be directly connected to Li-Fi access point 114 or directly connected to a CPE 112. These network configurations will be described in more detail below.

Li-Fi access points 114 may communicate using visible light communication. For example, a light source, such as light emitting diodes (LED), is used to send visible light signals to subscriber devices 115. In one example, the communication uses visible light between 400 and 800 THz (780-375 nm). Li-Fi access points 114 also include a receiver that can receive visible light input from subscriber devices 115.

Subscriber devices 115 may include various user devices, such as smartphones, set-top boxes, computers, and other home devices. Customer premise equipment 112 may include set-top boxes, gateways, routers, etc., but may be referred to as subscriber devices 115.

A channel manager 102 may be located in various positions in system 100, such as in four different positions although other positions may also be appreciated. Also, in system 100, it is possible that only a single configuration of channel manager 102 is provided. In other embodiments, channel manager 102 may be incorporated into one or more of the configurations shown in system 100. That is, system 100 may implement multiple different configurations or all of the configurations of channel manager 102 at the same time.

System 100 provides broadcast and narrowcast services, or possibly just narrowcast services. Broadcast services are where the same content is broadcast to multiple subscribers that share the available bandwidth. Narrowcast is where content is sent to a single subscriber through a dedicated link, such as to a single subscriber location through a 1:1 port to port subscriber line. In this case, the subscriber does not share the bandwidth on the subscriber line with other subscribers.

System 100 may use a radio fiber over glass (RFoG) infrastructure based on the DOCSIS standard, but other network infrastructures may be used. The DOCSIS 3.1 physical (PHY) and media access control (MAC) standards use a multiplexing scheme, such as orthogonal frequency division multiplexing (OFDM), to improve the data rate per available spectrum (bit/Hz) efficiency using low density parity check code (LDPC) for the OFDM forward error correction (FEC). Also, the DOCSIS 3.1 standard expands available bandwidth in network 106 to 1.218 GHz and then to 1.794 GHz. DOCSIS 3.1 has OFDM channels over the entire spectrum available for downstream and upstream communications. The entire available spectrum for downstream and upstream may be shared using wavelength division multiplexing (WDM) in an optical distribution network (ODN) 106 and a hybrid wireless (Wi-Fi)-wired (e.g., cable) space division multiplexing (SDM) scheme beyond customer premise equipment 112. This allows the downstream direction to use the full available spectrum and the upstream direction to use the full available spectrum in particular embodiments. Although DOCSIS 3.1 is described, it will be understood that other standards may also be used.

The upstream and downstream signals may be using downstream sub-carriers that are grouped into independently-configurable channels (e.g., OFDM channels) and occupy a frequency range spectrum from 24 MHz up to 192 MHz, which totals 7680 25 kHz sub-carriers or 3840 50 kHz sub-carriers. In the upstream direction, the sub-carriers may be composed of either 25 kHz or 50 kHz sub-carriers. In the upstream, the sub-carriers are grouped into independently-configured channels (e.g., OFDMA channels) each occupying a frequency range spectrum from 6.4 MHz for 25 kHz sub-carrier spacing and 10 MHz for 50 kHz sub-carrier spacing up to 96 MHz. Although these frequencies are described, it will be understood that particular embodiments may use different frequency ranges.

Figure 2A:
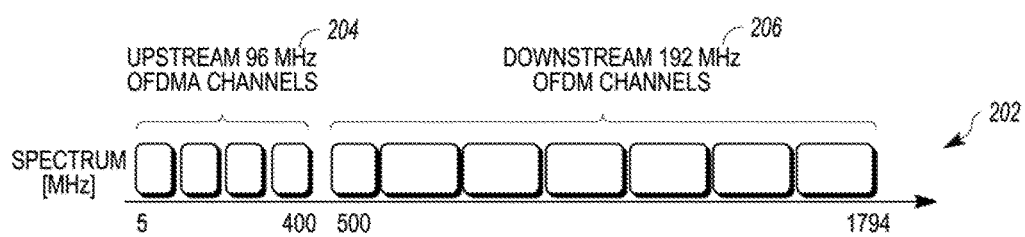
FIG. 2A shows the distribution of channels when the upstream direction and downstream direction share the full spectrum according to one embodiment.
Figure 2B:
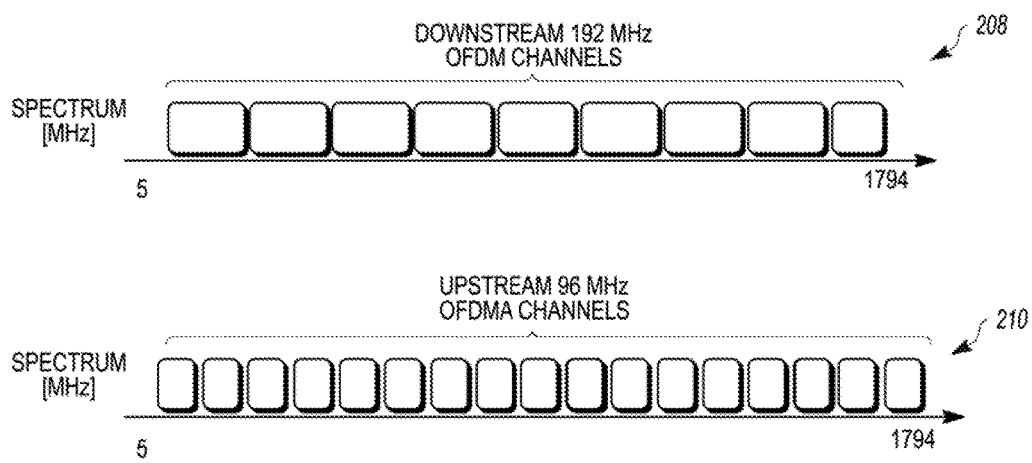
FIG. 2B shows the distribution of channels when the upstream direction and downstream direction both use the full spectrum according to one embodiment.

FIGS. 2A and 2B show different frequency allocations for the upstream and downstream directions that could be used. FIG. 2A shows the distribution of channels when the upstream direction and downstream direction share the full spectrum according to one embodiment. At 202, the upstream and downstream allocated channels in frequency division multiplexing are shown over the available spectrum from 5 MHz to 1794 MHz. The upstream spectrum is allocated from 5-400 MHz and the downstream is allocated from 500-1794 MHz. At 204, the upstream spectrum may be allocated in 96 MHz OFDMA channels and includes 4 channels. At 206, the downstream may be allocated with 192 MHz and 96 MHz OFDM channels and includes 6 192 MHz channels and 1 96 MHz channel.

FIG. 2B shows the distribution of channels when the upstream direction and downstream direction both use the full spectrum according to one embodiment. For HFC networks, the coaxial cable is the physical medium to connect to CPEs 112, thus the available bandwidth must be shared between the downstream and the upstream directions. However, when full end to end optical links are used, the full spectrum can both be used by the upstream and downstream directions. The downstream signal may be separated by wavelength division multiplexing from the upstream signal.

At 208, the downstream channels in the full spectrum are shown. In this case, nine 192 MHz OFDM channels are included in the spectrum from 5 MHz to 1794 MHz. At 210, in the upstream, eighteen 96 MHz OFDMA channels are included in the full spectrum from 5 MHz to 1794 MHz. Although the above use of frequency ranges are described for the channels, it will be understood that different schemes may be used, such as with different size channels and different frequency splits between the upstream and the downstream over the spectrum. For example, channel bandwidth can go up to 192 MHz in the downstream direction. However, channels for the downstream direction can be in multiples of 24 MHz per standard. For the upstream direction, channels can go up to 96 MHz, but they can be in multiples of 6.4 MHz. Also, for discussion purposes, the channel sizes may be described as being around 200 MHz in the downstream direction or around 100 MHz in the upstream direction in a frequency spectrum of 5-1800 MHz.

Referring back to FIG. 1, the downstream channels and upstream channels are used to manage narrowcast services to deliver information, such as high-speed data, to visible light communication access points 114. From headend 104, broadcast (B) and narrowcast (N) services may be transmitted to network 106 and are denoted in FIG. 1. Broadcast services are data services that are delivered to a group of subscribers in the network. For example, the broadcast signal is delivered to network node 108 and ONU nodes 110. Then, the broadcast signal is delivered to each CPE 112 connected to that respective node, where the group of CPEs share the bandwidth.

In contrast to broadcast services, narrowcast services use add/drop requests to a node serving a specific subscriber location to receive a narrowcast service. The add request adds a channel to an upstream signal and the drop request drops a channel from a downstream signal. In some embodiments, a subscriber may receive both narrowcast and broadband services and/or only narrowcast.

The add/drop function to add or drop channels in the broadcast signal may be in different locations depending on where the channel manager is implemented. For example, in a first configuration, channel manager 102 performs the add/drop in network node 108; in a second configuration, channel manager 102 performs the add/drop in ONU node 110-2; in a third configuration, channel manager 102 performs the add/drop in ONU node 110-1; in a fourth configuration, channel manager 102 performs the add/drop in CPE 112-2.

In the first configuration, a direct add/drop in network node 108 of upstream or downstream channels from/to Li-Fi access point 114-1 is provided. In this case, network node 108 may be a node in network 106 that can perform the add/drop function from/to access point 114-1 through optical fiber directly between network node 108 and Li-Fi access point 114-1. The connection between network node 108 and Li-Fi access point 114-1 is via narrowcast. Channel manager 102 de-multiplexes and down-converts the assigned downstream channels that are to be dropped and sends them to Li-Fi access point 114-1. In the upstream direction, the upstream channels from Li-Fi access point 114-1 that are to be added to the upstream signal are up-converted and multiplexed with other channels at network node 108 for upstream transmission to headend 104. The number of downstream and upstream channels and their bandwidth assigned for Li-Fi access point 114-1 depend on the QoS and maximum bit rate committed for that subscriber location. Li-Fi access point 114-1 may also be connected to subscriber devices 115-1, which receive the narrowcast signals in a downstream direction and send upstream signals to Li-Fi access point 114-1.

In the second configuration, ONU node 110-2 performs the add/drop function. ONU node 110-2 may, in the broadcast configuration, terminate the optical connection from network node 108, and may receive broadcast and narrowcast signals from network node 108. ONU node 110-2 may send broadcast signals via a non-optical connection, such as a coaxial connection, to CPE 112-1. Also, ONU node 110-2 may send narrowcast signals via an optical connection to Li-Fi access point 114-2. Channel manager 102-2 performs the drop function to separate the narrowcast signal from the downstream signal and the add function to add the narrowcast signal to the upstream signal at ONU node 110-2. Channel manager 102-2 may send the downstream narrowcast signal to Li-Fi access point 114-2 via an optical connection. Also, ONU node 110-2 may send a broadcast signal to CPE 112-1 via an optical connection and/or coaxial connection. The broadcast and narrowcast signals may be sent via different outputs at ONU node 110-2, such as different ports. As discussed above, ONU node 110-2 provides a narrowcast signal to Li-Fi access point 114-2 where the available bandwidth is not compromised.

The third configuration is similar to the second configuration except that an active splitter 116 may be used to split the signal to multiple Li-Fi access points 114-3-114-4. Although two Li-Fi access points are shown, any number may be coupled to active splitter 116. The multiple Li-Fi access points 114-3-114-4 share the narrowcast signal from ONU node 110-1. Active splitter 116 may be coupled to ONU node 110-1 via an optical connection or other connection, such as coaxial. In this configuration, the subscriber location can receive broadcast signals from ONU node 110-1 at CPE 112-3 in addition to receiving a narrowcast signal that can be used for multiple Li-Fi access points 114-3-114-4. Specific bandwidth and QoS requirements can be assigned to narrowcast links 118-1 and 118-2.

In the fourth configuration, network node 108 may connect directly to CPE 112-2 where channel manager 102-4 is located. This may be an extension of network node 108 to a hybrid fiber coax (HFC) network. In this case, network node 108 sends the broadcast/narrowcast signals to CPE 112-2. CPE 112-2 performs the add/drop function and channel manager 102-4 may drop narrowcast signals in the downstream and add narrowcast signals in the upstream. When the network is an HFC network, in one embodiment, CPE 112-2 has capabilities to separate the downstream broadcast and narrowcast signal in the radio frequency (RF) domain. Then, for the narrowcast signal, CPE 112-2 delivers the narrowcast to Li-Fi access point 114-5 via a connection, such as a coaxial connection or optical link. Li-Fi access point 114 may then deliver the service to subscriber devices 115-2.

Channel Manager

Channel manager 102 may perform similar functions irrespective of where it is located in any of the configurations. FIG. 3 depicts an architecture for channel manager 102 to process downstream signals according to one embodiment. Channel manager 102 includes a receiver 302, a splitter 304, a down-converter 306, a filter 308, and a transmitter 310. Receiver 302 includes a transmission line that receives the multiplexed downstream signal that includes multiple channels of a certain frequency range bundle, such as each bundle may be around 200 MHz. The signal may include broadcast and narrowcast channels. That is, some 200 MHz channels may be for broadcast services and some 200 MHz channels may be for narrowcast services. In another embodiment described below, all channels may be narrowcast.

Splitter 304 splits the downstream signal into a plurality of outputs. For example, the signal is sent on different paths to send the entire bandwidth of the signal to different conditioning circuits for down-conversion and filtering where signal can be processed as 5-200 MHz, 401-600 MHz and so on.

Down-converter 302 then down-converts each output to a different frequency. For example, all the outputs are down-converted to be in the 5-200 MHz frequency range. That is, the channel from 201 MHz to 400 MHz is down-converted to the 5-200 MHz range and the channel from 401-600 MHz is also down-converted to 5-200 MHz. All other channels are also down-converted to this frequency range.

The down-converted channels are then filtered at filter 308 to select the narrowcast channels. That is, only the channels that are for narrowcast are sent to transmitter 310 and filter 308 filters out the broadcast channels. Transmitter 310 includes a transmission line that couples the narrowcast channels to a transceiver for transmission to a Li-Fi access point 114.

FIG. 4 depicts an architecture of channel manager 102 for the upstream direction according to one embodiment. A receiver 402 receives upstream signals from subscriber devices 115 and/or Li-Fi access point 114 via a transmission line that couples the signals to channel manager 102. Receiver 402 receives these signals at a plurality of inputs. That is, each narrowcast signal may be received at a different input and each signal from CPE 112 is received at an input. In one embodiment, each upstream signal is received at the same frequency range, such as from 5-100 MHz.

An up-converter 404 then up-converts the inputs to stack the channels at different frequencies. That is, the OFDMA channels are up-converted to corresponding carrier frequency per channel bandwidth. For example, the channels that were received at the inputs at the same frequency of 5-100 MHz are stacked at different frequencies, such as from 5-100, 101-200, 201-300, 301-400, etc.

A multiplexer 406 multiplexes the up-converted signals into a common signal, such as an RF signal, for transmission. For example, a signal that includes the channels from 5-400 MHz (or 5-1800 MHz) is generated by multiplexer 406. This signal may include all upstream channels multiplexed. A transmitter 408 then couples the multiplexed signal to a transceiver that transmits the multiplexed signal to headend 104.

Figure 5A:
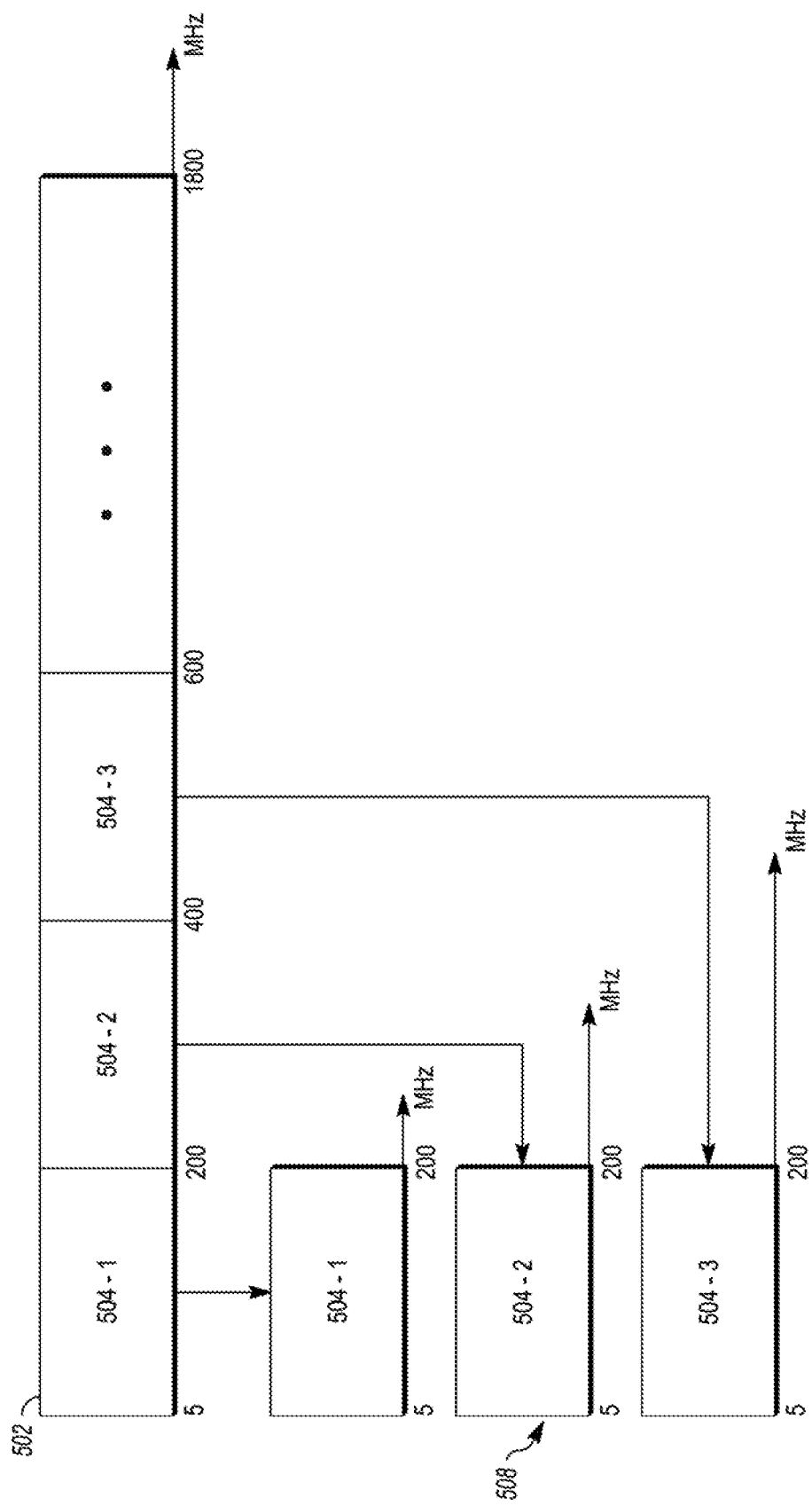
FIGS. 5A and 5B show the dropping and adding of channels according to one embodiment.
Figure 5B:
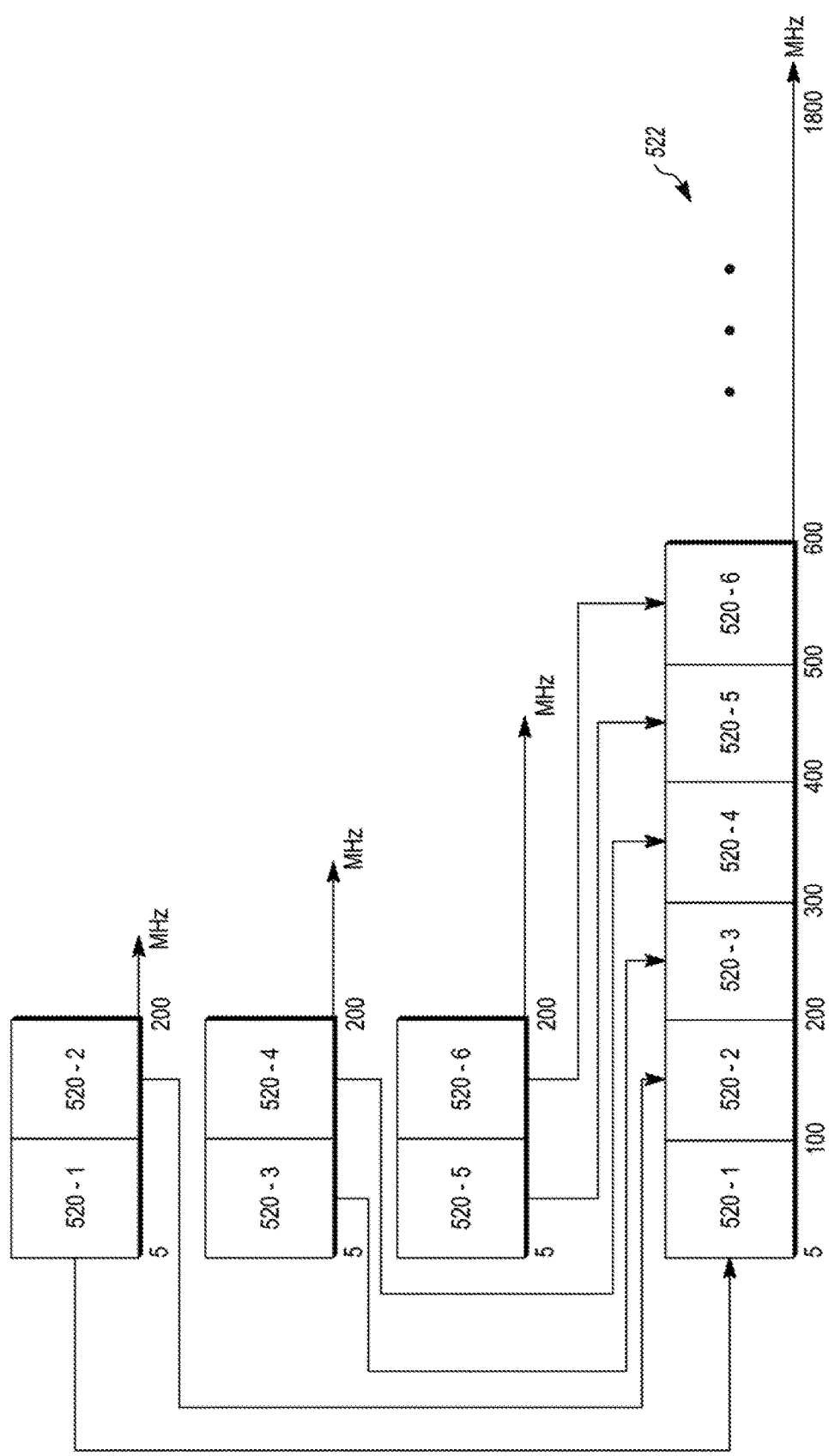

To illustrate the above up conversion and down conversion, FIGS. 5A and 5B show the dropping and adding of channels according to one embodiment. In FIG. 5A, a downstream signal at 502 is received with channels 504-1, 504-2, and 504-3. Channel 504-1, channel 504-2, and channel 504-3 are in the frequency range of 5-200 MHz, 201-400 MHz, 401-600 MHz respectively. Other channels may also be included but are not shown. Channel manager 102 can then down-convert the channels to the same frequency range of 5-200 MHz. As shown, channel 504-1, channel 504-2, and channel 504-3 are now down-converted to the 5-200 MHz frequency range as shown at 506. The channel that was already in the 5-200 MHz range does not need to be down-converted. In one embodiment, in the filtering, some of these channels may be dropped and only the narrowcast channels are kept. In one example, at 508, channel 504-2 is kept as a narrowcast channel and the other channels are dropped. In one embodiment, for a single output at the channel manager, only one down converter is required. For example, if only one channel will be output, then one downconverter is needed for channel 504-2, and only one filter to filter out channel 504-2. The number of down converters or filters depend on the number of outputs at the channel manager. Also, although a similar frequency of 5-200 MHz is shown, the downconversion and filtering for the downstream OFDM channels can be in multiples of 24 MHz up to 192 MHz. For example, channel manager 102 can have multiple outputs, such as 3 outputs, where output 1 has channel 5-29 MHz (24 MHz), output 2 with 5-200 MHz (192 MHz), and output 3 with 5-101 MHz (96 MHz).

In FIG. 5B, 100 MHz channels in the frequency range of 5-200 MHz are received and then up-converted to different frequencies for the upstream signal. For example, at 520-1-520-6, six channels are received at the same frequency range of 5-200 MHz. These channels are then up-converted to different frequencies of 5-100 MHz, 101-200 MHz, 201-300 MHz, 301-400 MHz, 401-500 MHz, and 501-600 MHz as shown at 522. The channel that was already in the 5-100 MHz range does not need to be up-converted. These channels may be added to the upstream signal. In this case, the channels are stacked in the frequency spectrum in the upstream signal.

Figure 6A:
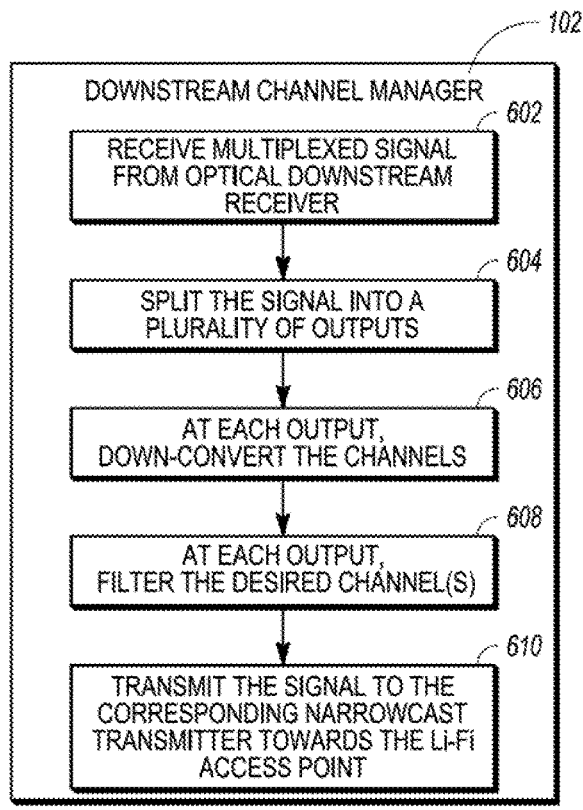
FIG. 6A shows a simplified flowchart of a method performed by the downstream channel manager.
Figure 6B:
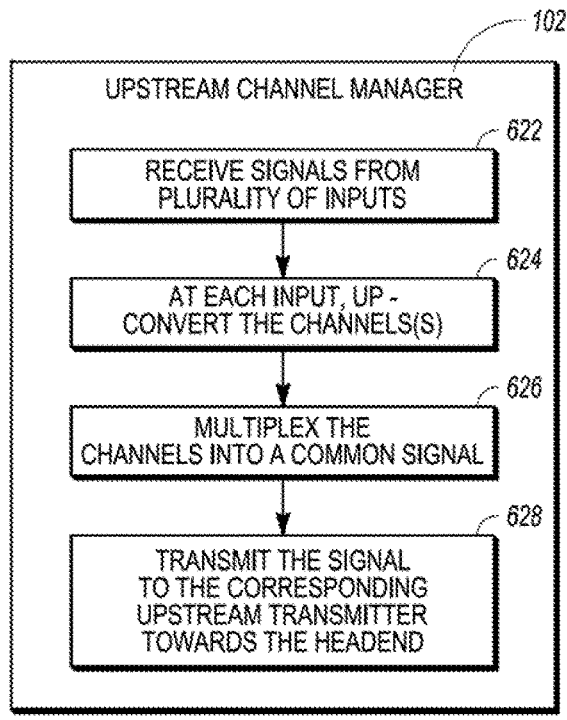
FIG. 6B shows a simplified flowchart of a method performed by the upstream channel manager.

FIGS. 6A and 6B show methods for processing downstream and upstream signals to perform the drop and add functions according to one embodiment. FIG. 6A shows a simplified flowchart of a method performed by the downstream channel manager and FIG. 6B shows a simplified flowchart of a method performed by the upstream channel manager.

Referring to FIG. 6A, at 602, channel manager 102 receives a multiplexed signal from a downstream receiver. At 604, channel manager 102 splits the signal into a plurality of outputs. At 606, at each output, channel manager 102 down-converts the channels. At 608, at each output, the desired channels are filtered. This removes any broadcast channels and selects the narrowcast channels. At 610, channel manager 102 transmits the signal to an optical transmitter that further transmits downstream narrowcast signal to Li-Fi access point 114.

Referring to FIG. 6B, at 622, channel manager 102 receives signals from a plurality of inputs, such as from subscriber devices or CPEs. At 624, at each input, channel manager 102 up-converts the channels. At 626, at each input, the up-converted channels are multiplexed into a common signal. This combines any broadcast channels and the narrowcast channels. At 628, channel manager 102 transmits the signal towards the headend using a return path optical transmitter for transmission to the headend.

Overall Structure

Figure 7:
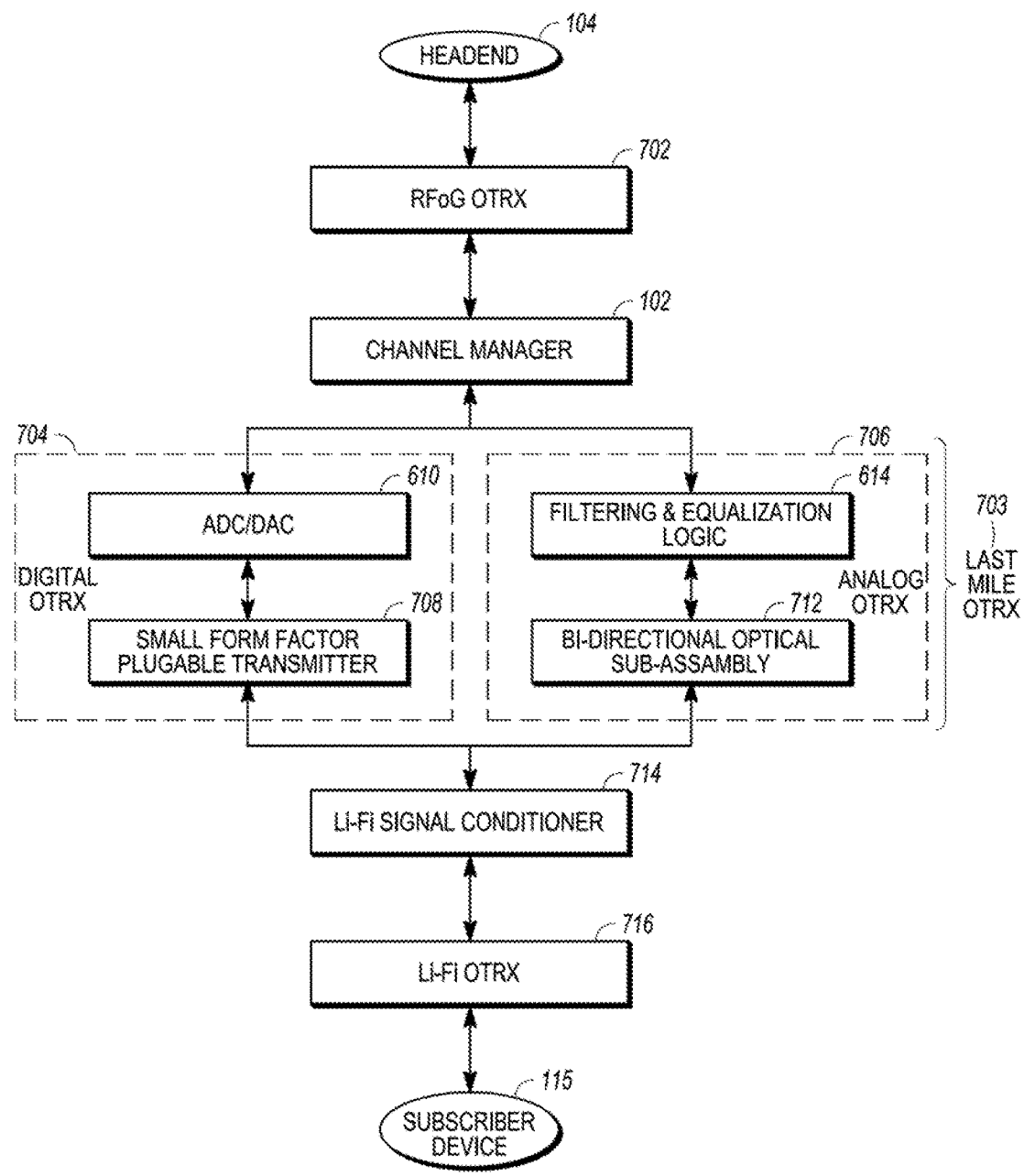
FIG. 7 depicts a more detailed example of elements used to deliver the narrowcast services to Li-Fi access points in the system according to one embodiment.

FIG. 7 depicts a more detailed example of elements used to deliver the narrowcast services to Li-Fi access points 114 in system 100 according to one embodiment. Depending on the configuration, elements of FIG. 7 may be distributed in different components of system 100. This figure attempts to cover the different locations that elements may be placed.

After headend 104, an optical transceiver (OTRX) 702, such as an RFoG optical transceiver, may be analog optical transceiver that can receive or transmit in a bandwidth capacity up to 1794 MHz and may be integrated into a single module. On the transmitter side, RFoG OTRX 702 may use external modulation using an electro-absorption modulator (EAM). The receiver module may include a receiver optical sub-assembly (ROSA) that follows the DOCSIS 3.1 standard in terms of bandwidth, noise, and distortion performance. The same RFoG OTRX can be used for both downstream and upstream reception and transmission, respectively, because the downstream and upstream optical links are utilizing the full spectrum available to transport narrowcast and broadcast load in the form of OFDM channels for downstream and OFDMA channels for upstream as shown in FIG. 2B.

Channel manager 102 sits between RFoG OTRX 702 and a last mile OTRX 703, such as either a digital OTRX 704 and/or analog OTRX 706. Either the digital or the analog transceiver may be used. The last-mile OTRX is designed to optically transmit the narrowcast OFDM channels in the downstream direction and receive the narrowcast OFDMA channels in the upstream direction. The narrowcast OFDM channels are sent to Li-Fi access points 114 and the narrowcast OFDMA channels are received from Li-Fi access points 114.

The downstream transmission from digital OTRX 704 can be performed digitally using a transmitter section of a small form-factor pluggable (SFP) transmitter 708. Also, in the analog OTRX 706, the downstream transmission is performed using the transmitter section of a bi-directional optical sub-assembly (BOSA). In one embodiment, the narrowcast signals in the channels are digitized. An analog-to-digital converter (ADC) and digital-to-analog converter (DAC) may be used to process the downstream OFDM channels in multiples up to 192 MHz. In one embodiment, using the digital OTRX, a maximum bandwidth of 200 MHz can be used to accommodate one 192 MHz downstream OFDM channel and two 96 MHz upstream OFDMA channels. For an analog transmission, a transmitter with capabilities up to 400 MHz can support transmission of two downstream 192 MHz OFDM channels. Other examples of transmission may also be possible.

In the upstream direction, digital OTRX 704 can receive channels at the receiver section of SFP 708. ADC/DAC 810 can up-convert the channels. Also, the analog version of the receiver section of the BOSA can convert upstream signals from the optical to the electrical domain. Filtering and equalization logic 714 can then process the electrical signal for upstream delivery. Other components of digital OTRX 704 and analog OTRX 706 may also be appreciated.

A Li-Fi signal conditioner 714 prepares a downstream signal to be transferred to a Li-Fi OTRX 716. In one embodiment, Li-Fi signal conditioner 714 includes an OFDM receiver for downstream OFDM channels that can receive the down-converted carrier frequency for the channels. Li-Fi signal conditioner 714 may prepare the data included in the downstream OFDM channel according to a protocol associated with a Li-Fi transmitter, such as a light emitting diode transmitter. For example, visible light communication uses wireless protocols similar to 802 protocols, such as IEEE 802.15.7 which specifies PHY and a MAC layer for short-range optical wireless communications using visible light and optically transparent media. In one embodiment, a modulation scheme, such as an on-off keying (OOK) modulation, is used to achieve a maximum of 96 Mpbs per PHY IEEE 802.15.7. The LEDs in a Li-Fi optical transceiver (OTRX) 716 are operated in response to positive electrical signals. Use of multi-carrier modulation techniques, such as OFDM, are used on the Li-Fi link level, which is a single point-to-point transmission from one transmitter to one receiver using a single LED.

Li-Fi signal conditioner 714 can modify complex-value bipolar signals that are suitable for Li-Fi transmission. In one embodiment, Li-Fi signal conditioner 714 creates a uni-polar signal from the bipolar signals. This can be accomplished in different ways, such as using a direct current (DC)-biased optical OFDM (DCO-OFDM), which significantly increases the power dissipation in the communication system. Also, asymmetrically-clipped optical OFDM (ACO-OFDM) can be used where only the odd-indexed sub-carriers in the OFDM frame are modulated with information. This creates symmetry in the time domain where every negative sample has a positive counterpart at a precise location in the time domain signal. Further, uni-polar OFDM (U-OFDM) can be used and takes a real bi-polar OFDM signal and generates a uni-polar signal by splitting every OFDM frame into two separate frames (positive and negative) in the time domain.

In the upstream direction, Li-Fi signal conditioner 714 includes an OFDMA transmitter to transmit the upstream OFDMA channels. The OFDMA transmitter can transmit the signal towards headend 104. The OFDMA transmitter may condition the signal for transmitting based on standards using digital signal processing (DSP) functions to condition a Li-Fi modulated signal into a format that can be sent through the network.

A Li-Fi optical transceiver (OTRX) 716 may include an optical transmitter (LED or LED array-based optical transmitter), an optical receiver (e.g., optical detector), an interface receiving unit, and an interface transmitting unit (e.g., drive circuits and filters). The LEDs are adapted to convert the electrical signal into an optical signal, and carry out wireless transmission using the visible spectrum. The optical receiver is adapted to receive an optical signal from the illumination from the user device, convert the received optical signal into an electrical signal, and transmit the electrical signal through the interface transmitting unit.

Figures 9, 9B:
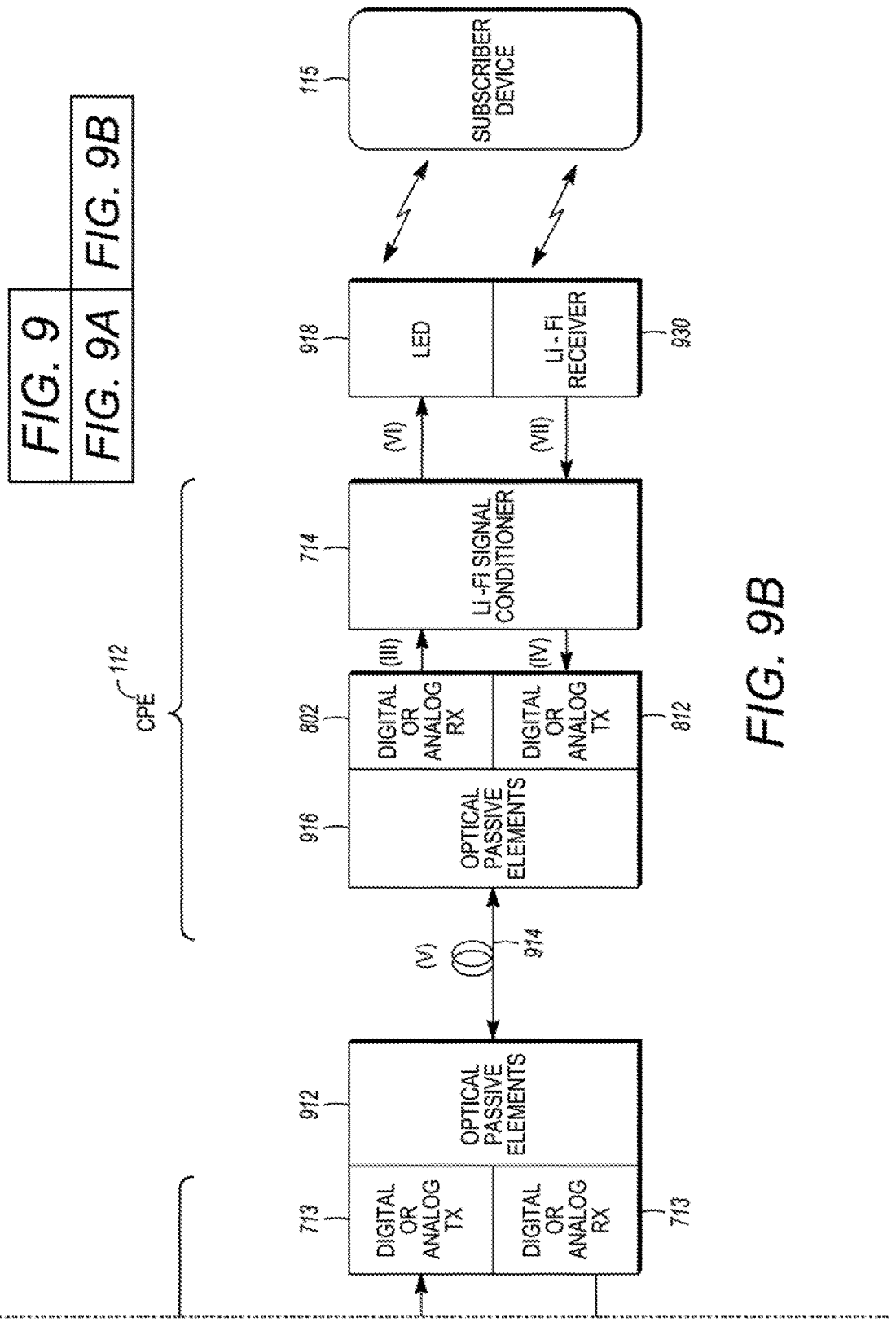

It is worth noting that an OTRX analog or digital is required at the input/output of the channel manager, while a second OTRX analog or digital is required at the input/output of the Li-Fi signal conditioner as shown in FIG. 9B.

Figure 8:
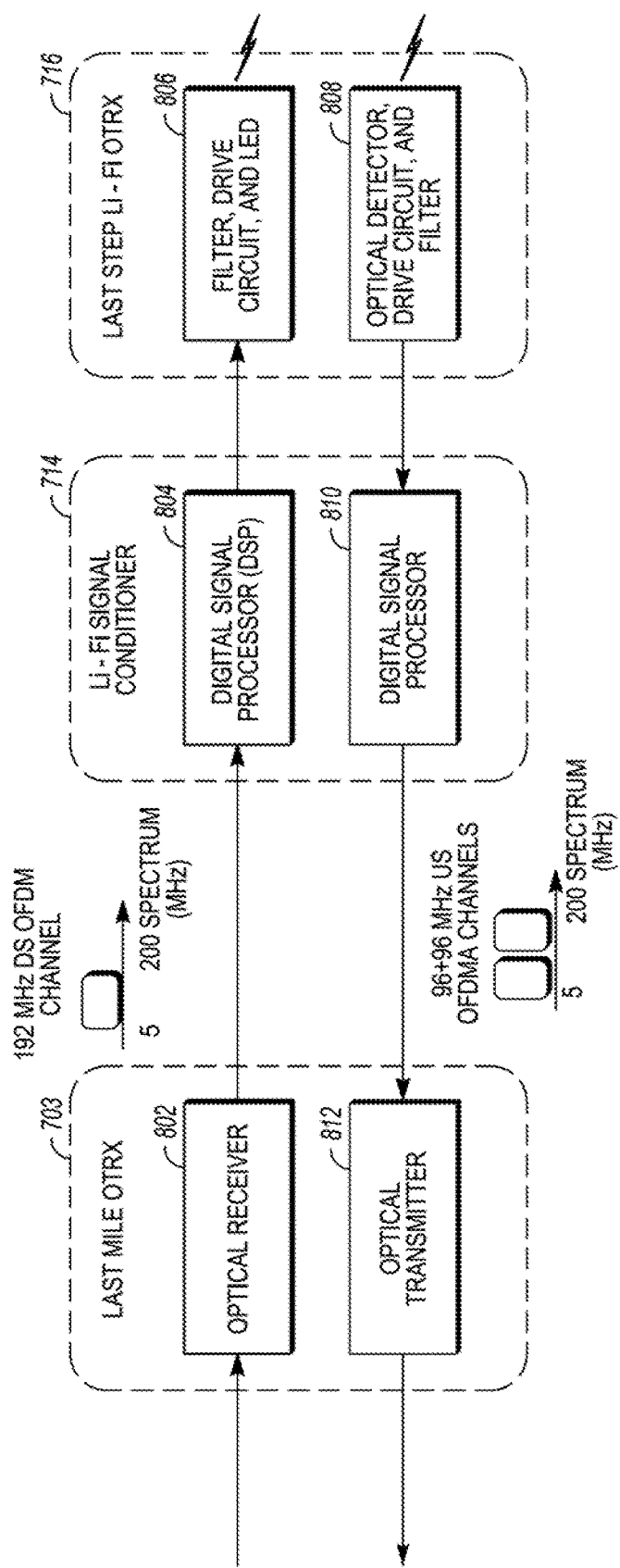
FIG. 8 shows a more detailed example of the structure of a last-mile OTRX, a Li-Fi signal conditioner, and a last-step Li-Fi OTRX.

FIG. 8 shows a more detailed example of the structure of last-mile OTRX 703 located at the input/output of the Li-Fi signal conditioner 714, and last-step Li-Fi OTRX 716. Last-mile OTRX 703 includes an optical receiver 802 that receives a signal from OTRX at the input/output of the channel manager 102. The OFDM channel is then sent to Li-Fi signal conditioner 714. A digital signal processor 804 processes the OFDM channel to convert the signal into a uni-polar OFDM signal.

Li-Fi conditioner 714 sends the uni-polar signal to last-step Li-Fi OTRX 716. Then a filter, drive circuit, and LED process the signal and output the visible light communication to a subscriber device 115.

Signals from subscriber devices 115 can be received at an optical detector, drive circuit, and filter 808 in last-step Li-Fi OTRX 716. Last-step Li-Fi OTRX 716 sends a uni-polar signal to a digital signal processor 810. Digital signal processor 810 then converts the uni-polar signal into an OFDMA signal, and sends the OFDMA channels to an optical transmitter 812 in last mile OTRX 703. Optical transmitter 812 can then send the OFDMA channels towards the OTRX located at the input/output of channel manager 102.

FIGS. 9A and 9B show the elements of FIGS. 7 and 8 overlaid over an RFoG/HFC network according to one embodiment. Variations of the structure may also be appreciated. In the downstream direction, at headend 104, a downstream OFDM manager 902 receives downstream OFDM channels, which may be included in the full available spectrum, such as from 5-1794 MHz. Each channel may be 192 MHz and included in the full spectrum. A transmitter 904 may transmit the downstream signal through optical passive elements 906. Network 106 transports the downstream signal to network node 108, which receives the downstream signal at optical passive elements 908 and a receiver 910.

Then, channel manager 102 may be located in network node 108, ONU node 110, or CPE 112, depending on the implementation. Channel manager 102 sends the broadcast downstream signal to CPE 112. Also, channel manager 102 can send the down-converted downstream OFDM channels in multiples of different frequencies, such as 24, 48, 96, and 192 MHz depending on the narrowcast service requirement. A digital or analog transmitter in last-mile OTRX 713 receives the narrowcast signal and sends the narrowcast signal through optical passive elements 912. The down-converted downstream channel may be sent via an optical network 914 at certain bandwidths, such as up to 200 and 400 MHz. For example, digital transmission may be up to 200 MHz and analog optical transmission may be up to 400 MHz. CPE 112 receives the down-converted downstream channels through optical passive elements 916 at a digital or analog receiver 802. A Li-Fi conditioner 714 receives the down-converted downstream channels and conditions the OFDM signal for LED direct modulation by an LED 918. The LED signals may be sent to subscriber device 115.

In the upstream direction, subscriber device 115 sends signals to a Li-Fi receiver (e.g., photodiode (PD)) 920. The signal received by the photodiode is then sent to Li-Fi signal conditioner 714 in a Li-Fi OFDM signal. Li-Fi signal conditioner 714 may convert the Li-Fi signal into down-converted upstream OFDMA channels in frequency multiples, such as in multiples of 6.4, 12.8, . . . , 89.6, and 96 MHz (in 10 MHz for 50 kHz sub-carriers).

In CPE 112, a digital or analog transmitter 812 sends the upstream signal towards headend 104. An upstream channel manager 102 in network node 108, ONU node 110, or CPE 112 can then up-convert the channels and stack them in the full spectrum available, such as from 5-1794 MHz. Upstream channel manager 102 may also stack upstream broadcast signals in the spectrum. The OFDMA channels are then sent to headend 104 and are received at receiver 918. An upstream OFDMA manager 920 receives the signal and outputs upstream OFDM channels in the full spectrum.

Configuration Descriptions

Figure 10:
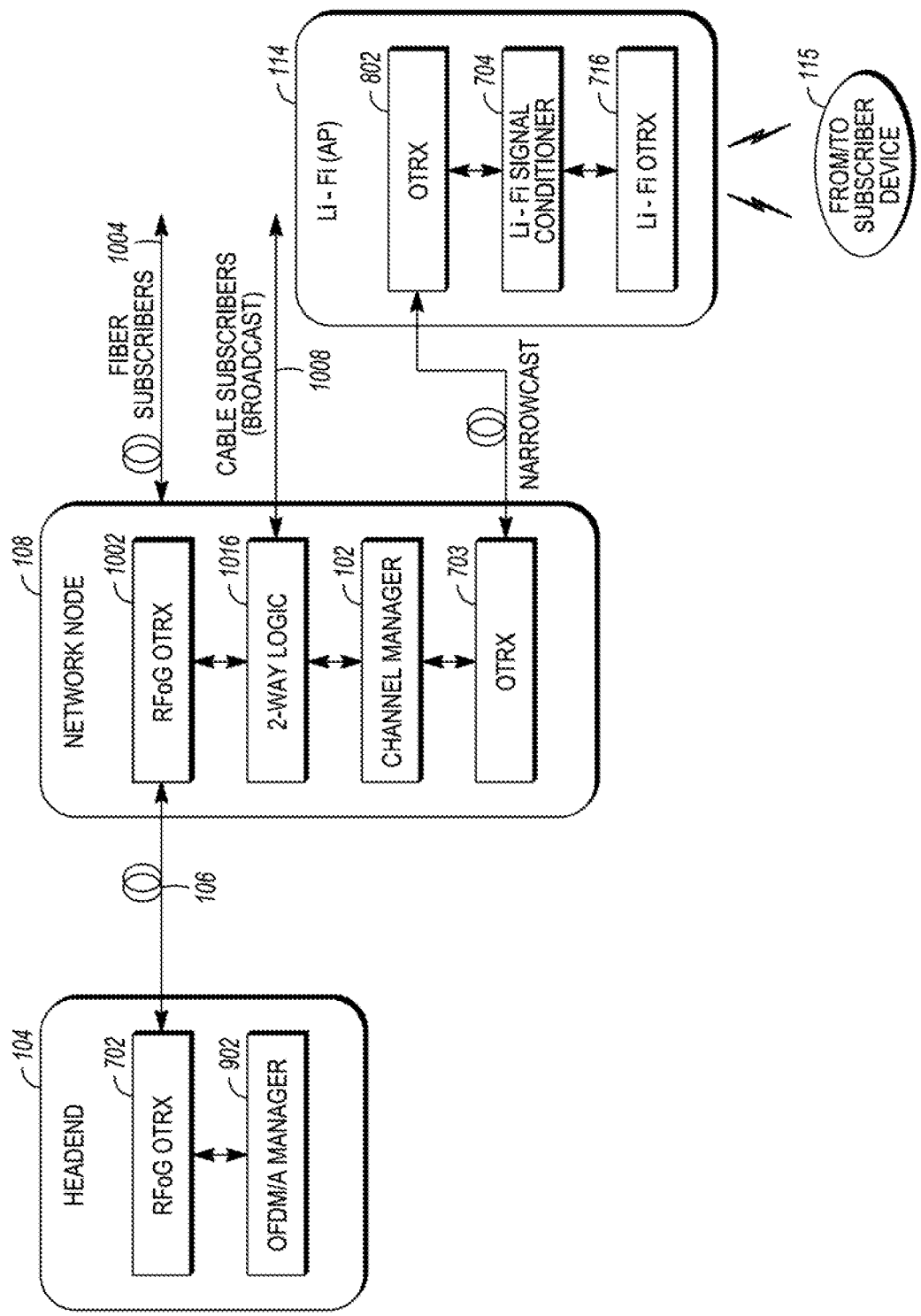
FIG. 10 shows an example of the first implementation of the channel manager according to one embodiment.

The different configurations will now be described in FIGS. 10-14. In FIGS. 10-14, optical fiber links are marked with two circles and other links may be electrical links using cable. FIG. 10 shows an example of the first implementation of channel manager 102 in system 100 according to one embodiment. In this case, network node 108 includes channel manager 102. In headend 104, an optical transceiver, such as RFoG OTRX 702, can send downstream signals to network node 108. An RFoG OTRX 1002 receives the downstream signals. Network node 108 can send the broadcast signal to fiber subscribers at 1004 and also cable subscribers at 1008. Two-way logic 1006 is used to send signals to cable subscribers via broadcast through a radio frequency connection, such as coaxial.

Channel manager 102 also receives the signal and can down-convert the signal as described above. OTRX 703 can then send the down-converted signal via narrowcast to Li-Fi access point 114. OTRX 802 receives the down-converted signal and sends the signal to Li-Fi signal conditioner 714. Li-Fi OTRX 716 then sends the signal to subscriber device 115 using visible light communication.

In the upstream direction, Li-Fi OTRX 716 sends signals through Li-Fi signal conditioner 714 and OTRX 802. Li-Fi access point 114 then sends the narrowcast signal to OTRX 703. Channel manager 102 then up-converts the signal and stacks the channels in the frequency spectrum possibly with channels from the fiber subscribers at 1004 or cable subscribers at 1008. RFoG OTRX 1002 can then send the signal to headend 104.

Figure 11:
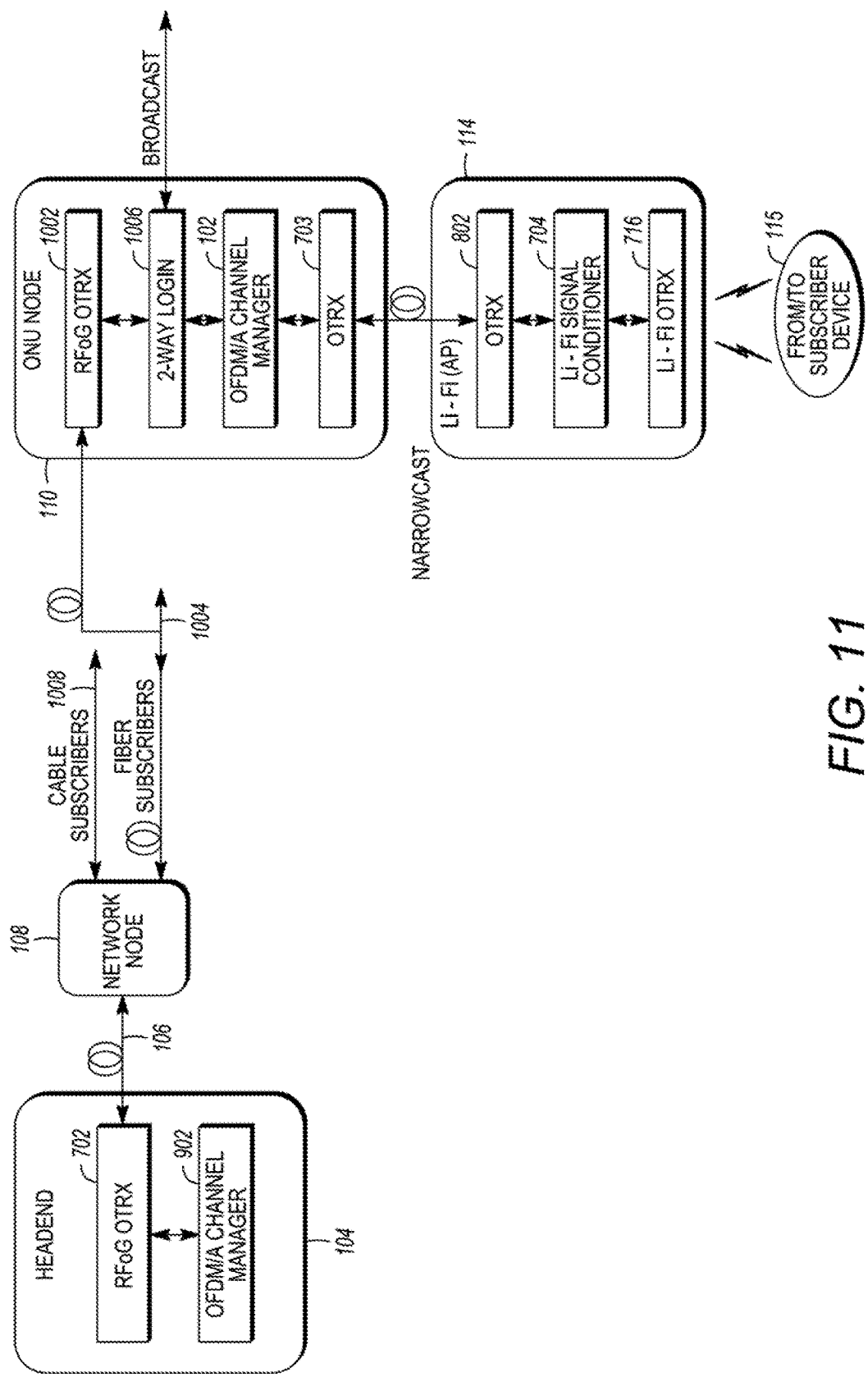
FIG. 11 depicts a second implementation of the channel manager according to one embodiment.

FIG. 11 depicts a second implementation of channel manager 102 according to one embodiment. In this implementation, channel manager 102 is found in ONU node 110.

In this case, network node 108 receives the broadcast signal from headend 104. Network node 108 can send the broadcast signal to cable subscribers at 1008 and also to fiber subscribers at 1004 as described in FIG. 10. The broadcast signal sent to fiber subscribers is also sent to ONU node 110 and received at RFoG OTRX 1002. Two-way logic 1006 can also send the broadcast signal to customer premise equipment. Channel manager 102 and OTRX 703 then transmit the signal to Li-Fi access point 114. The processing in Li-Fi access point 114 has been discussed above.

In the upstream direction, channel manager 102 receives an upstream signal from Li-Fi access point 114 and can up-convert the signal into OFDMA channels that are stacked frequency-wise. The signal is then sent from ONU node 110 via the RFoG OTRX to network node 108, which sends the signal to headend 104.

Figure 12:
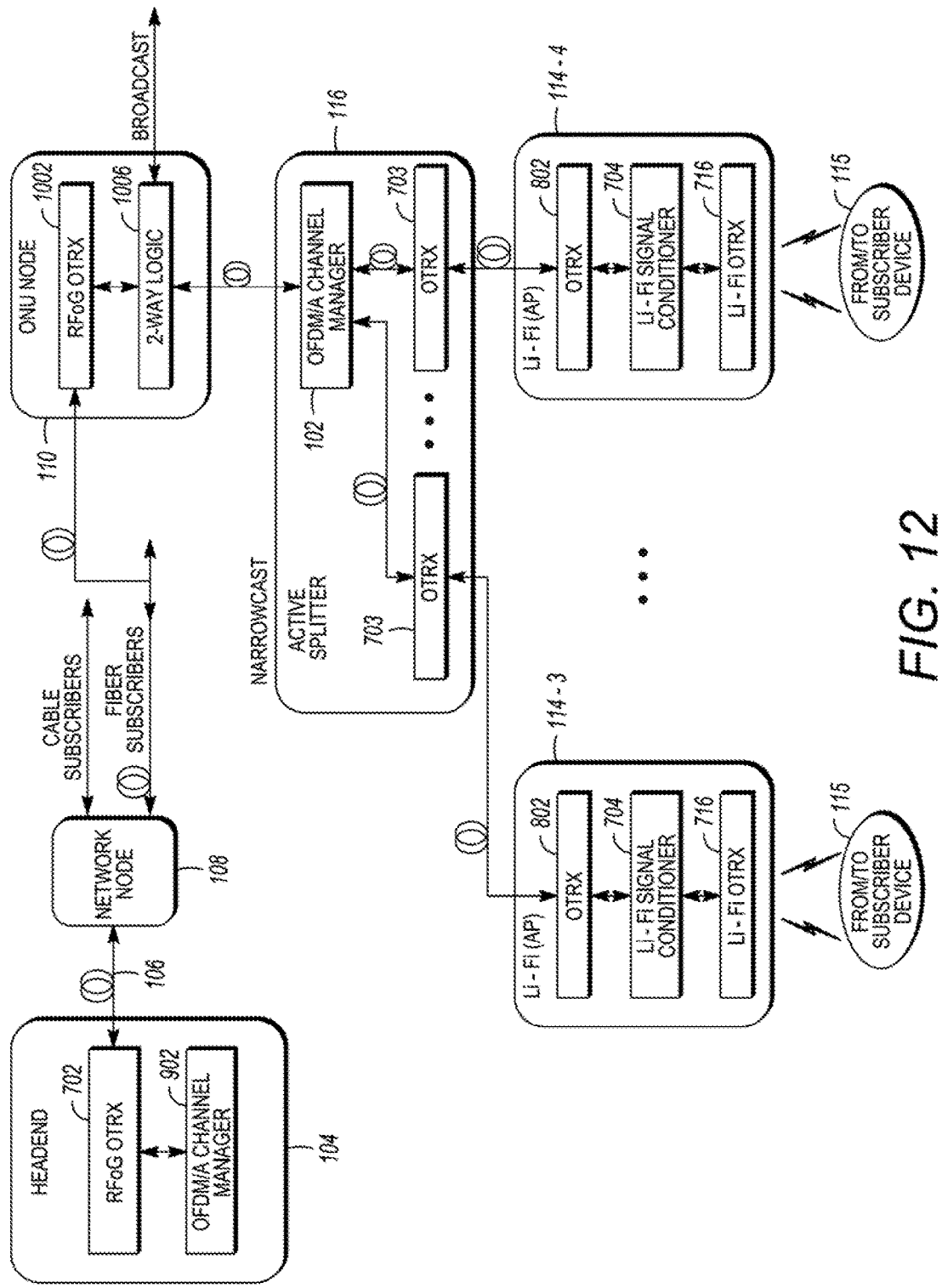
FIG. 12 depicts a third implementation of the channel manager according to one embodiment.

FIG. 12 depicts a third implementation of channel manager 102 according to one embodiment. Headend 104 and network node 108 perform similar functions as described in FIG. 11. ONU node 110 includes RFoG OTRX 1002 that receives the signal and two-way logic 1006 to send the signal to cable subscribers and also to an active splitter 116.

Active splitter 116 includes channel manager 102 and OTRX 703. In this case, channel manager 102 may send copies of the down-converted channels to multiple OTRX 703. Alternatively, the signals can be different OFDM channels per each channel manager output. As discussed above, the channel manager output may have one downconverter and filter depending the OFDM channel that is required on that narrowcast link. Each OTRX 703 may then send the signal to a respective Li-Fi access point 114-3-114-4. In the upstream direction, each Li-Fi access point 114 sends signals to OTRX 703 and active splitter 116. Then, channel manager 102 may up-convert and stack the signals from multiple OTRX 703. The upstream signal is then sent to ONU node 110 and towards headend 104.

Figure 13:
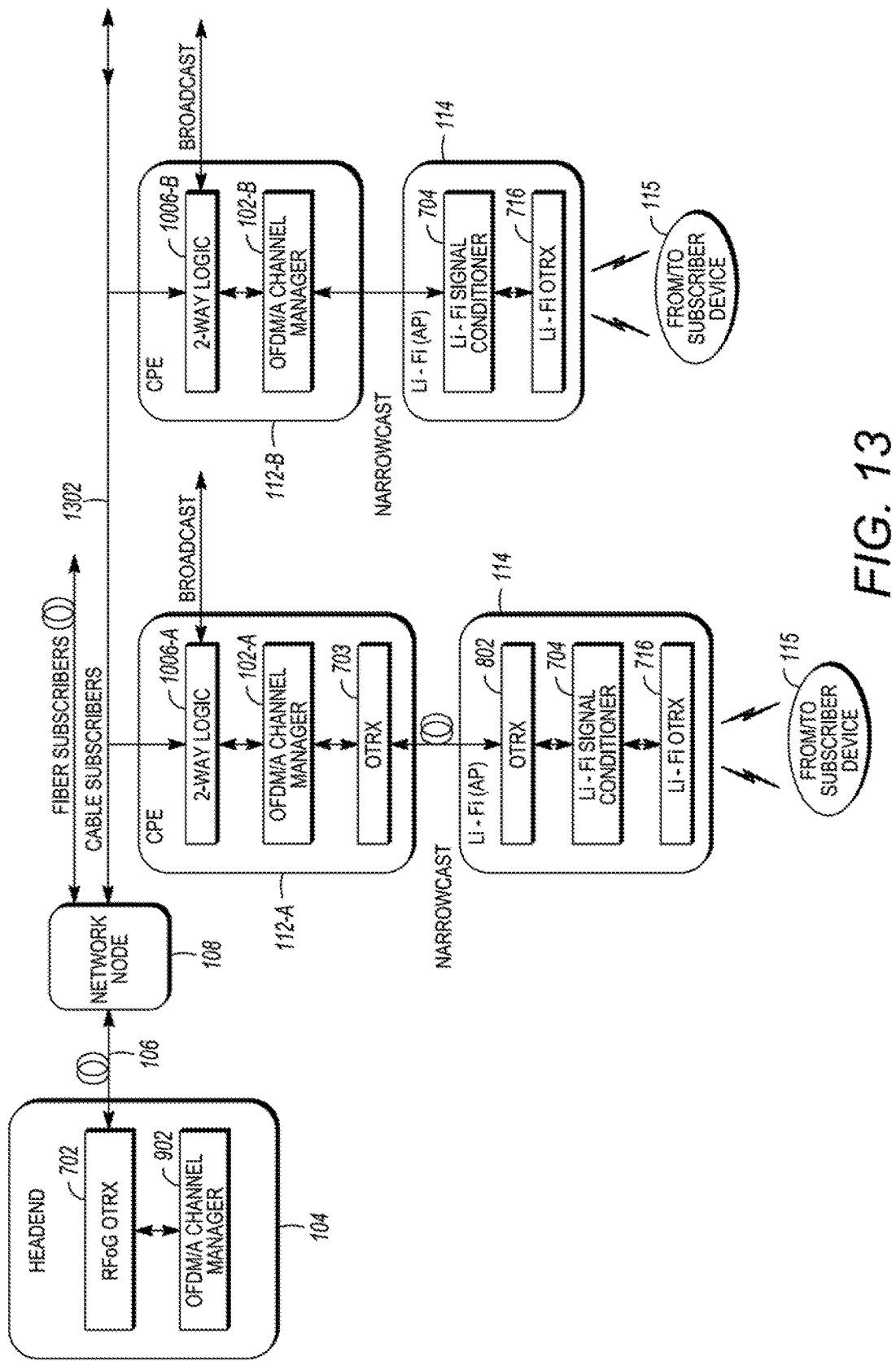
FIG. 13 depicts the fourth implementation of the channel manager according to one embodiment.

FIG. 13 depicts the fourth implementation of channel manager 102 according to one embodiment. In this example, channel manger 102 is located in CPE 112. In this case, network node 108 receives the signal from headend 104 and can send an electrical signal via cable network to CPE 112-A and CPE 112-B at 1302. CPE 112-A may be different from CPE 112-B in that CPE 112-A may transmit an optical signal to Li-Fi access point 114 while CPE 112-B does not transmit an optical signal. Rather, CPE 112-B may have a Li-Fi access point 114 embedded in it and the signal is sent directly to the Li-Fi conditioning circuit for its transmission by Li-Fi access point 114.

CPE 112-A receives the broadcast signal at two-way logic 1006-9 and can send a broadcast signal to cable subscribers. Also, channel manager 102-A can down-convert the signal (e.g., the specific narrowcast OFDM channel) and OTRX 703 transmits an optical signal to OTRX 802 of Li-Fi access point 114. The downstream signal is then sent through Li-Fi signal conditioner 714 and Li-Fi OTRX 703 as described above.

In the upstream direction, the upstream signal is received from Li-Fi access point 114 at CPE 112-A. Channel manager 102 can then up-convert the signals to stack the frequencies with any signals from the broadcast signals received at 2-way logic. The signal is then sent back to headend 104 as described above through network node 108.

In the downstream direction at CPE 112-B, two-way logic 1006-B receives the cable signal and can send the cable signal via broadcast. Channel manager 102 can also downconvert the channels into the same frequency range. Because Li-Fi access point 114 is embedded in the CPE, the optical link is not needed. Li-Fi access point 114 uses a Li-Fi signal conditioner 714 to condition the signal and Li-Fi OTRX 716 transmits the visible light communication signal to subscriber devices 115.

In the upstream direction, channel manager 102 receives the signal from Li-Fi access point 114. Then, channel manager 102 up-converts the signal as described above, stacks the channels with other channels from 2-way logic 1006-B, and sends the signal to headend 104.

Narrowcast Implementation

Figure 14:
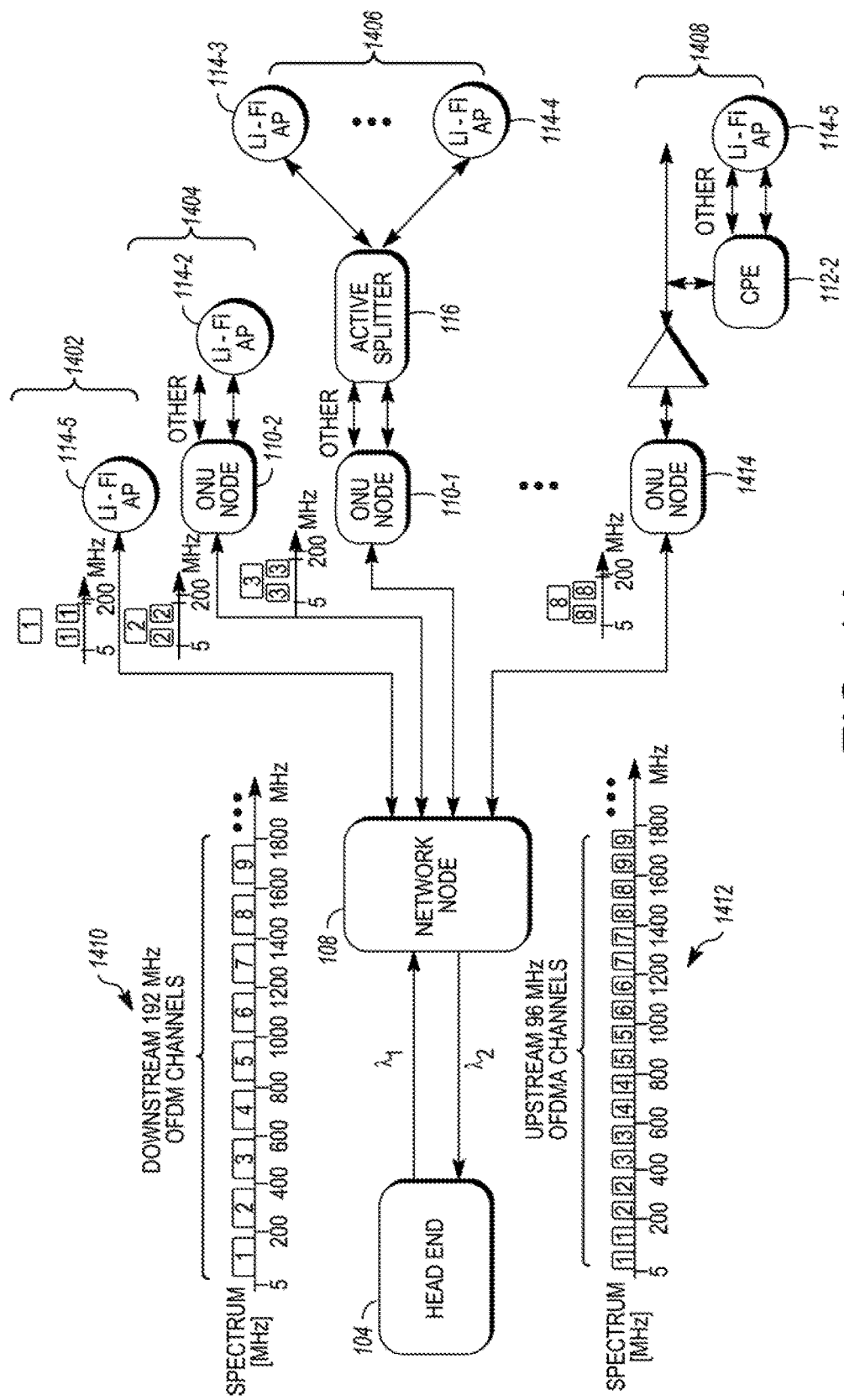
FIG. 14 shows an all narrowcast implementation according to one embodiment.

Particular embodiments may also be used to send narrowcast signals in channels for the entire spectrum. However, as discussed above, broadcast and narrowcast channels may be sent in the spectrum. FIG. 14 shows an all narrowcast implementation according to one embodiment. The system in FIG. 14 uses similar implementations as described in FIG. 1 and is based on an RFOG infrastructure, but may be applied to other types of networks. For example, the first configuration is shown at 1402; the second configuration is shown at 1404; the third configuration is shown at 1406; and the fourth configuration is shown at 1408. The downstream channels are shown at 1410 and include approximately 200 MHz OFDM channels from the spectrum of 5 MHz-1800 MHz. The upstream channels are shown at 1412 and include approximately 100 MHz OFDM channels from the spectrum of 5 MHz-1800 MHz. This uses the full spectrum available for communications. Although 1800 MHz is described as the full spectrum, other frequency ranges maybe used, such as 1800, 3 GHz, 3-5 GHz. The downstream signal may be sent using a first wavelength $\lambda1$. This may be at a different wavelength than the upstream signal which is sent at a second wavelength $\lambda2$. The wavelength division multiplexing allows the full spectrum to be used for downstream or upstream communications without interference.

Headend 104 sends the downstream signal in the full spectrum to network node 108. Then, network node 108 may then demultiplex the signal into separate channels and downconvert the channels into the same frequency range of 5-200 MHz. Network node 108 sends the different channels to different components. For example, the first channel is sent to Li-Fi access point 114-5; the second channel is sent to ONU node 110-2; the third channel is sent to ONU node 110-1; and the eighth channel is sent to ONU node 1414 and then to CPE 112-2. Network node 108 may send the channels via optical fiber. Other channels may be sent to other devices, but are not shown. The down converter is used is to allow the use of low-cost (low bandwidth) optical transceivers connecting from Node or CPEs to Li-Fi access points. In other embodiments, downconverters may not be used.

In the upstream direction, two 100 MHz channels may be sent upstream from devices. This provides symmetric upstream and downstream channels where two #1 channels are sent upstream from Li-Fi access point 114-5, two #2 channels are sent from ONU node 110-2, two #3 channels are sent from ONU node 110-1, and two #8 channels are sent from CPE 112-2. These upstream channels are then stacked frequency-wise in the full spectrum from 5 MHz-1800 MHz as shown at 1412. Network node 108 then sends the stacked OFDMA channels via a second wavelength multiplexing $\lambda2$ to headend 104.

MoCA Configuration

Figure 15:
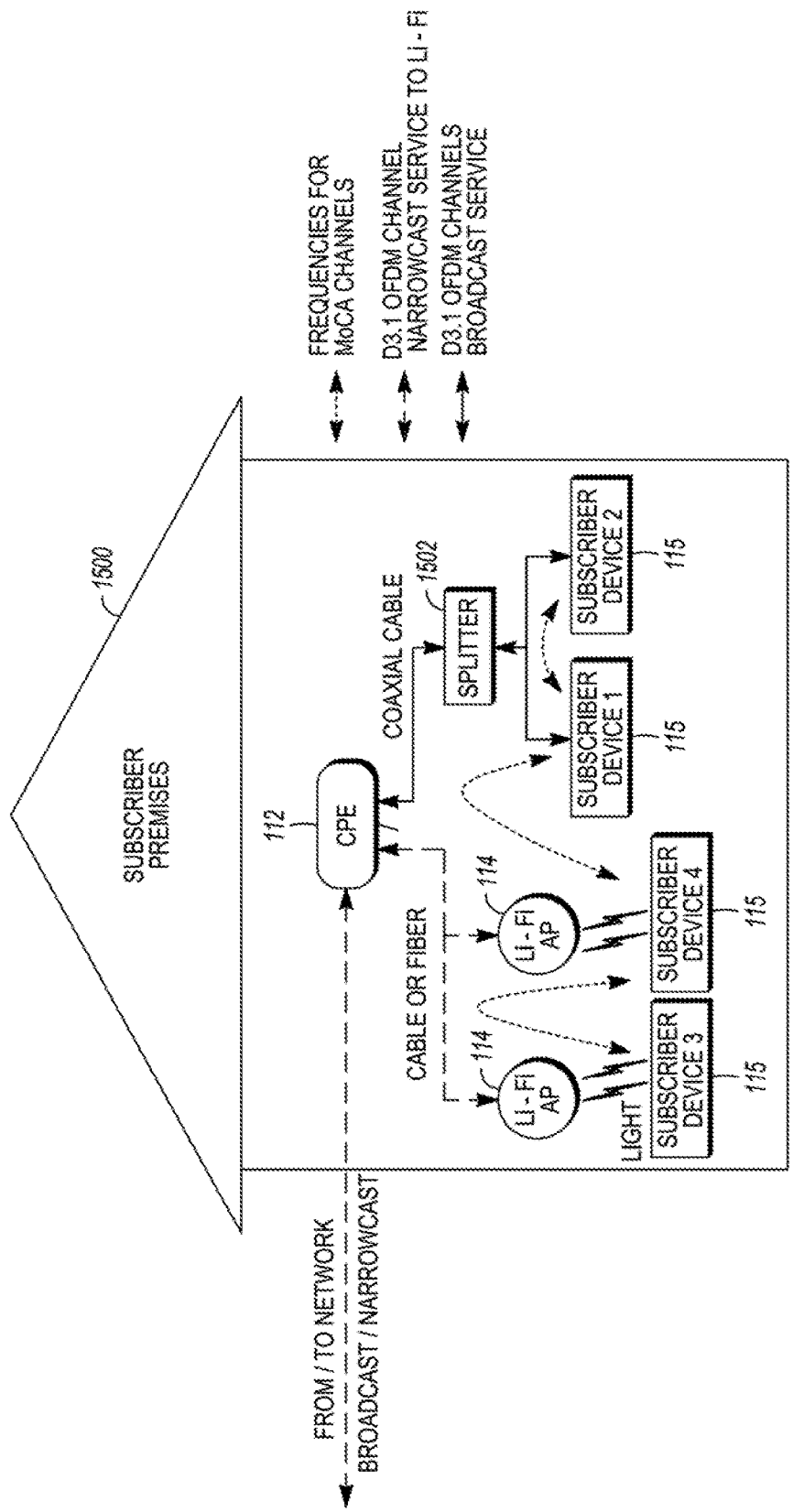
FIG. 15 depicts an example of using visible light communication in a MoCA environment according to one embodiment.

The visible light communication techniques described above may also be used to supplement MoCA environments. FIG. 15 depicts an example of using visible light communication in a MoCA environment according to one embodiment. CPE 112 receives the broadcast/narrowcast signal from the network. Li-Fi access points 114 can then receive narrowcast signals via cable or fiber and communicate signals to subscriber device #3 or subscriber device #4. The Li-Fi access point 114 may use frequencies that are different from that used by MoCA devices and thus do not interfere with the MoCA communications. Also, via coaxial cable, the broadcast signals are sent to a splitter 1502 which can then send the broadcast signal to subscriber device #1 or subscriber device #2. Additionally, the visible light communication may also be used in a MoCA environment using optical links. In this case, CPE 112 may communicate with Li-Fi access points 114 via optical links in addition to splitter 1502.

The above alleviates MoCA congestion due to the limited available spectrum for MoCA. This is because Li-Fi can use a much larger bandwidth than MoCA and thus narrowcast can be used to avoid overlapping with the MoCA spectrum and create an interface using different hybrid physical infrastructure. In one example, the broadcast signal from CPE 112 to the coaxial cable is up to 1 GHz, and upstream and downstream spectrum should be shared as presented in FIG. 2A, since connections are in coaxial cable. Thus, MoCA operates from 1 GHz to 1.6 GHz between devices. Therefore, in the narrowcast output from CPE 112 to Li-Fi access points 114, if coaxial cable is used, narrowcast channels are within the bandwidth of up to 1 GHz. When Li-Fi APs are connected via coaxial cable, management of narrowcast for downstream and upstream channels to Li-Fi access points 114 is based on frequency plan per FIG. 2A (e.g., upstream is from 5-400 MHz and downstream from 400-1800 MHz). However, if optical fiber is used from the CPE narrowcast output (channel manager output) to Li-Fi access points 114, then the complete spectrum can be used for upstream and downstream communications to Li-Fi access points 114. This is because the MoCA channels do not interfere on the fiber links.

When using coaxial cable for subscriber devices #3 and #4, the communication between subscriber devices #1, #2, #3, and #4 is based on MoCA frequency plan (e.g., 1 to 1.6 GHz). However, when subscriber devices #3 and #4 are connected via optical fiber to increase bandwidth capabilities, they do not interfere with MoCA frequency plan as explained above. The communication between subscriber devices #1 and #2 to subscriber devices #3 and #4 is performed as follows: subscriber devices #1 and #2 use MoCA frequency plans to CPE 112, then from CPE 112 to subscriber devices #3 and #4, channel manager 102 is used to accommodate the spectrum accordingly to avoid interference with current narrowcast services (e.g., narrowcast service from 5-200 MHz and communication between subscriber devices #1 and #2 to subscriber devices #3 and #4 from 200-400 MHz.

Figure 16:
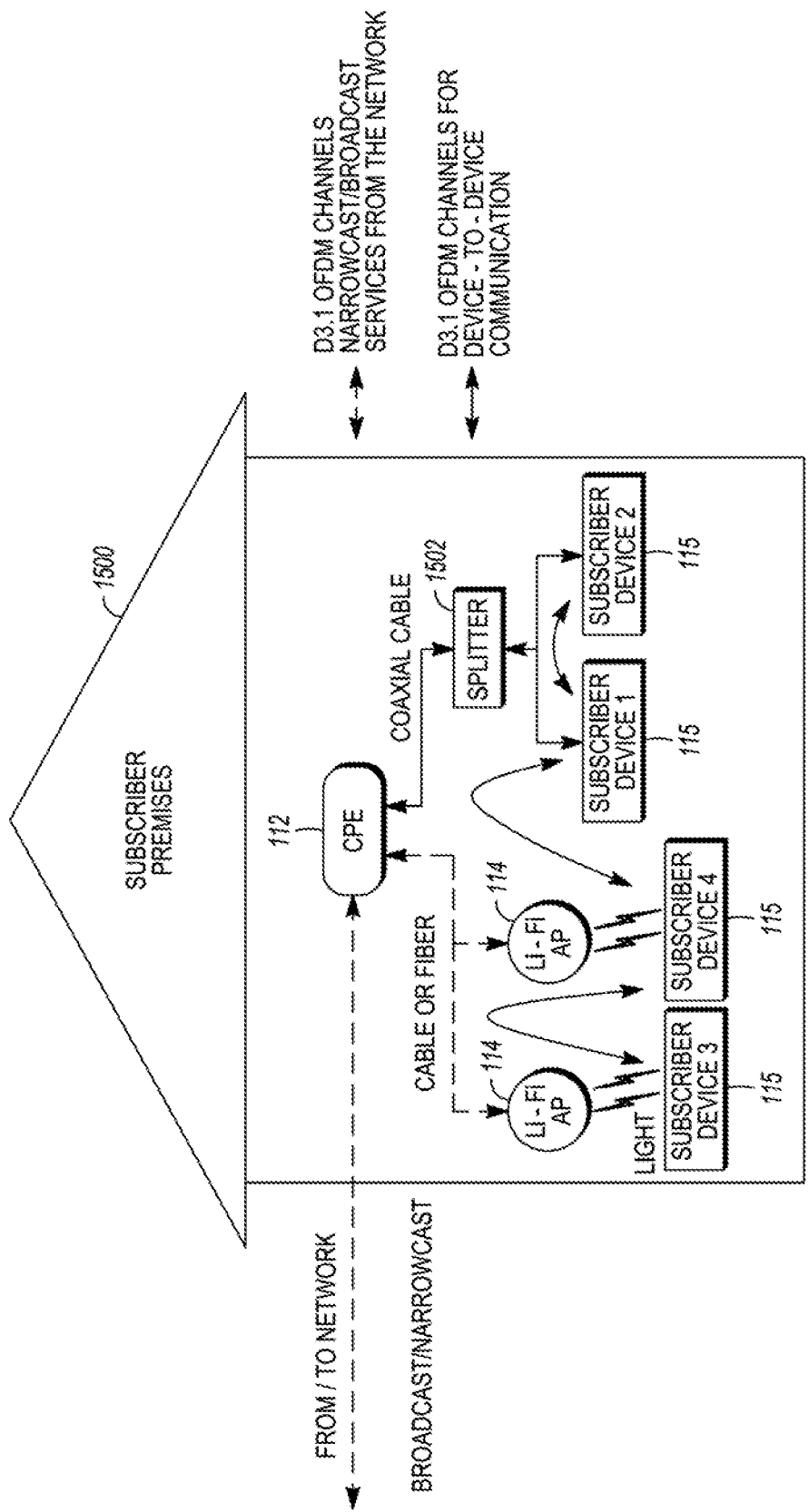
FIG. 16 depicts an example of using visible light communication in a MoCA environment using cable for fiber connections according to one embodiment.

FIG. 16, describes the complete substitution of MoCA frequency plans by the management of narrowcast OFDM channels according to one embodiment. Channel manager 102 when setup at CPE 112 can also provide local in-home services for device-to-device communication using hybrid links fiber-cable-light. This avoids the limited spectrum assignation as occurs in MoCA. Channel manager 112 at CPE 112 assigns the corresponding narrowcast OFDM channels to Li-Fi access points 114. In addition, channel manager 102 manages other OFDM channels available locally at home network for device-to-device communication for multimedia transfer.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a downstream multiplexed signal that includes a plurality of channels;
   splitting, by the computing device, the downstream multiplexed signal into a plurality of outputs;
   converting, by the computing device, at least a portion of the outputs into a plurality of channels at one or more frequency ranges;
   selecting, by the computing device, a set of channels in the plurality of channels; and
   sending, by the computing device, channels in the set of channels via narrowcast to a set of visible light communication access points using the one or more frequency ranges, wherein a respective set of subscriber devices receive a channel in the set of channels via visible light communication from respective visible light communication access points; and
   sending a broadcast downstream signal over coaxial cable to a first set of subscriber devices using a first frequency spectrum different from the one or more frequency ranges, wherein a channel in the set of channels is sent to a same premises as the broadcast downstream signal using the one or more frequency ranges to a second set of subscriber devices.

2. The method of claim 1, further comprising:
   receiving a plurality of signals from the set of subscriber devices in the one or more frequency ranges;
   converting the plurality of signals to the plurality of frequency ranges;
   multiplexing the plurality of signals into an upstream multiplexed signal; and
   transmitting the upstream multiplexed signal upstream.

3. The method of claim 2, wherein multiplexing the upstream plurality of signals comprises:
   combining the plurality of signals with signals from other subscriber devices that are different from the set of subscriber devices.

4. The method of claim 2, wherein:
   the downstream multiplexed signal is received using a frequency spectrum, and
   the upstream multiplexed signal is sent using the frequency spectrum.

5. The method of claim 4, wherein the downstream multiplexed signal is separated by wavelength division multiplexing from the upstream multiplexed signal.

6. The method of claim 1, wherein the plurality of channels for the downstream multiplexed signal are sent via narrowcast.

7. The method of claim 1, wherein the plurality of channels for the downstream multiplexed signal include channels to be sent via narrowcast and channels to be sent via broadcast.

8. The method of claim 1, further comprising:
   transmitting the downstream multiplexed signal in a broadcast to another set of subscriber devices in which the another set of subscriber devices share bandwidth in the broadcast.

9. The method of claim 1, further comprising:
   transmitting a channel in the set of channels to a visible light communication access point in the set of visible light communication access points via an optical link.

10. The method of claim 1, wherein the set of channels is transmitted from a node, wherein the node services one or more optical networking nodes and receives the downstream multiplexed signal from the headend.

11. The method of claim 1, wherein the channel is transmitted from an optical networking node, wherein the optical networking node services customer premise equipment and receives the downstream multiplexed signal from a node in the network.

12. The method of claim 1, wherein the channel is transmitted from a customer premise equipment, wherein the customer premise equipment receives the downstream multiplexed signal from a node that services other nodes in the network.

13. The method of claim 1, wherein the channel is transmitted from a node to a splitter, wherein the splitter splits the channel to the set of visible light communication access points.

14. The method of claim 1, where the first set of subscriber devices communicate with the second set of subscriber devices using the first frequency spectrum and not the one or more frequency ranges.

15. A non-transitory computer-readable storage medium containing instructions that, when executed, control a computer system to be configured for:
  receiving a downstream multiplexed signal that includes a plurality of channels;
  splitting the downstream multiplexed signal into a plurality of outputs;
  converting at least a portion of the outputs into a plurality of channels at a similar frequency range;
  selecting a set of channels in the plurality of channels;
  sending channels in the set of channels via narrowcast to a set of visible light communication access points using the similar frequency range, wherein a respective set of subscriber devices receive a channel in the set of channels via visible light communication from respective visible light communication access points; and
  sending a broadcast downstream signal over coaxial cable to a first set of subscriber devices using a first frequency spectrum different from the similar frequency range, wherein a channel in the set of channels is sent to a same premises as the broadcast downstream signal using the similar frequency range to a second set of subscriber devices.

16. The non-transitory computer-readable storage medium of claim 15, further configured for:
  receiving a plurality of signals from the set of subscriber devices in the similar frequency range;
  upconverting the plurality of signals to the plurality of frequency ranges;
  multiplexing the upconverted plurality of signals into an upstream multiplexed signal; and
  transmitting the upstream multiplexed signal upstream.

17. The non-transitory computer-readable storage medium of claim 15, further configured for:
  transmitting the downstream multiplexed signal in a broadcast to another set of subscriber devices in which the another set of subscriber devices share bandwidth in the broadcast.

18. The non-transitory computer-readable storage medium of claim 15, further configured for:
  transmitting a channel in the set of channels to a visible light communication access point in the set of visible light communication access points via an optical link.

19. An apparatus comprising:
  one or more computer processors; and
  a non-transitory computer-readable storage medium comprising instructions that, when executed, control the one or more computer processors to be configured for:
  receiving a downstream multiplexed signal that includes a plurality of channels;
  splitting the downstream multiplexed signal into a plurality of outputs;
  converting at least a portion of the outputs into a plurality of channels at a similar frequency range;
  selecting a set of channels in the plurality of channels;
  sending channels in the set of channels via narrowcast to a set of visible light communication access points using the similar frequency range, wherein a respective set of subscriber devices receive a channel in the set of channels via visible light communication from respective visible light communication access points; and
  sending a broadcast downstream signal over coaxial cable to a first set of subscriber devices using a first frequency spectrum different from the similar frequency range, wherein a channel in the set of channels is sent to a same premises as the broadcast downstream signal using the similar frequency range to a second set of subscriber devices.

* * * * *